US005780451A

United States Patent [19]
DeMichele et al.

[11] Patent Number: 5,780,451
[45] Date of Patent: *Jul. 14, 1998

[54] NUTRITIONAL PRODUCT FOR A PERSON HAVING ULCERATIVE COLITIS

[75] Inventors: Stephen Joseph DeMichele, Dublin; Keith Allen Garleb, Powell; John William McEwen, Gahanna; Martha Kay Fuller, Westerville, all of Ohio

[73] Assignee: Abbott Laboratories, Abbott Park, Ill.

[*] Notice: The term of this patent shall not extend beyond the expiration date of Pat. No. 5,444,054.

[21] Appl. No.: 221,349

[22] Filed: Apr. 1, 1994

[51] Int. Cl.$^6$ ............ A61K 31/715; A23G 3/00; A23G 9/00
[52] U.S. Cl. ............ 514/54; 514/168; 514/188; 514/552; 514/566; 514/725; 514/810; 514/812; 514/813; 514/861; 426/567; 426/658
[58] Field of Search ............ 424/639, 641, 424/643, 655, 678, 681, 682; 514/168, 188, 458, 474, 566, 725, 810, 812, 813, 552, 861, 54; 536/56, 102, 123.1; 426/567, 658

[56] References Cited

U.S. PATENT DOCUMENTS

| 4,666,701 | 5/1987 | Horrobin et al. | 424/10 |
|---|---|---|---|
| 4,681,896 | 7/1987 | Horrobin | 514/552 |
| 4,806,569 | 2/1989 | Horrobin | 514/552 |
| 4,851,431 | 7/1989 | Yehuda | 514/560 |
| 4,868,212 | 9/1989 | Horrobin | 514/552 |
| 4,921,877 | 5/1990 | Cashmere et al. | 514/866 |
| 4,973,467 | 11/1990 | Sahley | 424/439 |
| 4,976,960 | 12/1990 | Grossman et al. | 424/195.1 |
| 4,994,442 | 2/1991 | Gil et al. | 514/45 |
| 5,104,677 | 4/1992 | Behr et al. | 426/590 |
| 5,300,493 | 4/1994 | Romeo et al. | 514/54 |
| 5,308,627 | 5/1994 | Umbdenstock, Jr. | 424/639 |
| 5,332,579 | 7/1994 | Umbdenstock | 424/639 |

FOREIGN PATENT DOCUMENTS

| 0115419 | 1/1984 | European Pat. Off. | A61K 31/20 |
|---|---|---|---|
| 0404058 | 6/1990 | European Pat. Off. | A23D 9/00 |
| 0484266 | 6/1992 | European Pat. Off. | |
| 4304394 | 9/1993 | Germany | |
| 92-120850 | 3/1992 | Japan | A61K 31/20 |
| WO90/12080 | 10/1990 | WIPO | C11C 3/102 |
| WO93/21912 | 11/1993 | WIPO | A61K 31/23 |

OTHER PUBLICATIONS

Mulder et al., "Decrease in Two Intestinal Copper/Zinc Containing Proteins With Antioxidant Function in Inflammatory Bowel Disease", GUT, 32:1146 (1991).

Münchow et al. Arch. Anim. Nutr., vol. 38, No. 5, pp. 375–385, (1988), [English Translation].

Glawischnig, Deutsche Tierartzliche Wochenschrift, vol. 97(1), pp. 48–51, (1990) [English Translation].

Gedek Zbl. Hyg., vol. 191, pp. 277–301, (1991), [English Translation].

Rosenberg et al., "Nutritional Aspects of Inflammatory Bowel Disease", Annual Review of Nutrition, 5:463–484 (1985).

Gonzalez–Huix et al., "Enteral versus Parenteral Nutrition as Adjunct Therapy in Acute Ulcerative Colitis", The American Journal of Gastroenterology, 8:2:227–232 (1993).

Sutton, "Nutritional Needs of Children with Inflammatory Bowel Disease", Nutrition, 18:10:21–25 (1992).

Glotzer et al., "Proctitis and Colitis Following Diversion of the Fecal Stream", Gastroenterology, 80:438–441 (1981).

Komorowski, "Histologic Spectrum of Diversion Colitis", American Journal of Surgical Pathology, 14:548 (1990).

Roediger, "The Starved Colon—Diminished Mucosal Nutrition, Diminished Absorption, and Colitis", Diseases of the Colon and Rectum, 33:858–862 (1990).

Harig et al., "Treatment of Diversion Colitis with Short–Chain–Fatty Acid Irrigation", New England Journal of Medicine, 310:23–28 (1989).

Roediger, "The Colonic Epithelium in Ulcerative Colitis: an Energy Deficiency Disease?", The Lancet, 2:712–715 (1980).

Vernia et al, "Fecal Lactate and Ulcerative Colitis", Gastroenterology, 95:1564–1568 (1988).

Vernia et al., "Organic Anions and the Diarrhea of Inflammatory Bowel Disease", Digestive Diseases and Sciences, 33:1353–1358 (1988).

Breuer et al., "Rectal Irrigation with Short–Chain Fatty Acids for Distal Ulcerative Colitis", Digestive Diseases and Sciences, 36:185(1991).

Senagore et al., "Short–Chain Fatty Acid Enemas: a Cost Effective Alternative in the Treatment of Nonspecific Proctosigmoiditis", Diseases of the Colon and Rectum, 35:923 (1992).

Scheppach et al., "Effect of Butyrate Enemas on the Colonic Mucosa in Distal Ulcerative Colitis", Gastroenterology, 103:51–56 (1992).

Smith et al., "Introduction to the Metabolic Activities of Intestinal Bacteria", American Journal of Clinical Nutrition, 32:149–157 (1979).

Miller et al., "Fermentations by Saccarolytic Intestinal Bacteria", American Journal of Clinical Nutrition, 32:164–172 (1979).

(List continued on next page.)

Primary Examiner—John Kight
Assistant Examiner—Howard C. Lee
Attorney, Agent, or Firm—Lonnie Drayer; Thomas D. Brainard; J. Michael Dixon

[57] ABSTRACT

An enteral nutritional product for a person having ulcerative colitis contains in combination (a) an oil blend which contains eicosapentaenoic acid (20:5n3) and/or docosahexaenoic acid (22:6n3), and (b) a source of indigestible carbohydrate which is metabolized to short chain fatty acids by microorganisms present in the human colon. Preferably the nutritional product also contains one or more nutrients which act as antioxidants.

18 Claims, 5 Drawing Sheets

OTHER PUBLICATIONS

Cummings, "Fermentation in the Human Large Intestine: Evidence and Implications for Health", The Lancet, May 1983, pp. 1206–1209.

Titgemeyer et al., "Fermentability of Various Fiber Sources by Human Fecal Bacteria in vitro", American Journal of Clinical Nutrition, 53:1418–1424 (1991).

Salyers et al., "Fermentation of Mucin and Plant Polysaccharides by Strains of Bacteroides from the Human Colon", Applied and Environmental Microbiology, 33:319–322 (1977).

Mitsuoka et al., "Effect of Fructo–oligosaccharides on Intestial Microflora", Die Nahrung, 31:427–436 (1987).

Tokunaga et al., "Influence of Chronic Intake of New Sweetener Fructooligosaccharide (Neosugar) on Growth and Gastrointestinal Function of the Rat", Journal of Nutritional Science and Vitaminology, 32:111–121 (1986).

Janne et al, "Colonic Mucosal Atrophy Induced by a Liquid Elemental Diet in Rats", Digestive Diseases, 22:9:808–812 (1977).

Morin et al., "Small Intestinal and Colonic Changes Induced by Changes in a Chemically Defined Diet", Digestive Diseases and Sciences, 25:2:123–128 (1980).

Sircar et al., "Effect of Synthetic Diets on Gastrointestinal Mucosal DNA Synthesis in Rats", American Journal of Physiology, 244:G327 (1983).

Ryan et al., "Effects of Various Diets on Colonic Growth in Rats", Gastroenterology, 77:658–663 (1979).

Storme et al, "The Effect of a Liquid Elemental Diet on Cell Proliferation in the Colon of Rats", Cell and Tissue Research, 216:221–225 (1981).

Goodlad et al., "Proliferative effects of fibre on the intestinal Epithelium: Relationship to Gastrin, Enteroglucagon and PYY", Gut, 28:S1:221–226 (1987).

Kripe et al, "Stimulation of Intestinal Mucosal Growth with Intracolonic Infusion of Short–Chain Fatty Acids", Journal of Parenteral and Enteral Nutrition, 13:2:109 (1989).

Sheppach et al., "Effect of Short–Chain Fatty Acids on the Human Colonic Mucosa in Vitro", Journal of Parenteral and Enteral Nutrition, 16:1:43 (1992).

Sakata, "Stimulatory Effect of Short–Chain Fatty Acids on Cell Proliferation in the Rat Intestine: a Possible Explanation for Trophic Effects of Fermentable Fibre, Gut Microbes and Luminal Trophic Factors", British Journal of Nutrition, 58:95–103 (1987).

Thomas et al., "Effect of Enteral Feeding on Intestinal Epithelial Proliferation and Fecal Bile Acid Profiles in the Rat", Journal of Parenteral and Enteral Nutrition, 17:3:210 (1993).

Rolandelli et al., "Comparison of Parenteral Nutrition and Enteral Feeding with Pectin in Experimental Colitis in the Rat", American Journal of Clinical Nutrition, 47:715 (1988).

McBurney et al., "Effect of Human Faecel Innoculum on In Vitro Fermentation Variables", British Journal of Nutrition, 58:233 (1987).

McBurney et al., "Effect of Human Faecel Donor on In Vitro Fermentation Variables", Scandanavian Journal of Gastroenterology, 24:259 (1989).

Merchen et al., "Effect of Intake and Forage Level on Ruminal Turnover Rates, Bacterial Protein Synthesis and Duoderal Amino Acid Flows in Sheep", Journal of Animal Science, 62:216–225 (1986).

Barker et al., "The Calorimetric Determination of Lactic Acid in Biological Material", Journal of Biological Chemistry, 138:535 (1941).

Baldwin, "Energy Metabolism in Anaerobes", The American Journal of Clinical Nutrition, 23:11:1508 (1970).

Ozaki et al., "Effect of Xylooligosaccharide on the Growth of Bifidobacteria", Bifidobacteria Microflora, 9:2:77 (1990).

Sharon et al., "Role of Prostaglandins in Ulcerative Colitis. Enhanced Production During Active Disease and Inhibition by Sulfasalazine", Gastroenterology, 75:638 (1978).

Ligumsky et al., "Enhanced Thromboxane Az and Prostacyclin Production by Cultured Rectal Mucosa in Ulcerative Colitis and Its Inhibition by Steroids and Sulfasalazine", Gastroenterology, 81:444 (1981).

Sharon et al., "Enhanced Synthesis of Leukotrine B4 by Colonic Mucosa in Inflammatory Bowel Disease", Gastroenterology, 86:453(1984).

Lauritsen et al., "In Vivo Effects of Orally Administered Prednisolone on Prostaglandin and Leucotriene Production in Ulcerative Colitis", Gut 28:1095 (1987).

Lauritsen et al., "In Vivo Profiles of Eicosanoids in Ulcerative Colitis, Crohn's Colitis and Clostridium Difficile Colitis", Gastroenterology, 95:1:11 (1988).

Seidman, "Nutritional Management of Inflammatory Bowel Disease", Gastroenterology Clinics of North America, 171:1:129(1989).

Dudrick et al., "Nutritional Management of Inflammatory Bowel Disease", Surgical Clinics of North America, 71:3:609(1991).

Teahon et al., "The Role of Enteral and Parenteral Nutrition in Crohn's Disease and Ulcerative Colitis", Progress In Inflammatory Bowel Disease, 12:2:1 (1991).

Vilaseca et al., "Participation of Thromboxane and Other Eicosanoid Synthesis in the Course of Experimental Inflammatory Colitis", Gastroenterology, 98:269 (1990).

Donowitz, "Arachidonic Acid Metabolites and Their Role in Inflammatory Bowel Disease. An Update Requiring Addition of a Pathway", Gastroenterology, 88:580 (1985).

Musch et al., "Stimulation of Colonic Secretion by Lipoxygenase Metabolites of Arachidonic Acid", Science, 217:1255 (1982).

Palmer et al., "Chemokinetic Activity of Arachidonic Acid Lipoxygenase Products on Leuocytes of Different Species", Prostaglandins, 20:2:411 (1980).

Stenson et al., "Monohydroxyeicosatetraenoic Acids (HETEs) Induce Degranulation of Human Neutrophils", Journal of Immunology, 124:5:2100 (1980).

Empey et al., "Fish Oil–Enriched Diet is Mucosal Protective Against Acetic Acid–Induced Colitis in Rats", Canadian Journal of Physiology and Pharmacology, 69:480 (1991).

Vilaseca et al., "Dietary Fish Oil Reduces Progression of Chronic Inflammatory Lesions in a Rat Model of Granulomatous Colitis", Gut, 31:539 (1990).

Schepp et al., "Fish Oil Reduces Ethanol–Induced Damage of the Duodenal Mucosa in Humans", European Journal of Clinical Investigation, 21:230 (1991).

Lorenz et al., "Supplementation with n–3 Fatty Acids From Fish Oil in Chronic Inflammatory Bowel Disease—a Randomized, Placebo Controlled, Double–Blind Cross–Over Trial", Journal of Internal Medicine Supplement, 225:225 (1989).

Hillier et al., "Incorporation of Fatty Acids from Fish Oil and Olive Oil Into Colonic Mucosal Lipids and Effects Upon Eicosanoid Synthesis in Inflammatory Bowel Disease", Gut, 32:1151 (1991).

Saloman et al., "Treatment of Ulcerative Colitis with Fish Oil n–3–W–Fatty Acid: An Open Trial", Journal of Clinical Gastroenterology, 12:2:157 (1990).

Fretland et al., "Eicosanoids and Inflammatory Bowel Disease: Regulation and Prospects for Therapy", Prostaglandins Leukotrines and Essential Fatty Acids, 41:215 (1990).

Grisham et al., "Metabolism of Trinitrobenzene Sulfonic Acid by the Rat Colon Produces Reactive Oxygen Species", Gastroenterology, 101:540 (1991).

Sartor et al., "Granulomatous Enterocolitis Induced in Rats by Purified Bacterial Cell Wall Fragments", Gastroenterology, 89:587 (1985).

Grisham, "Rate of Neutrophil–Derived Oxidants in The Pathogenesis of Inflammatory Bowel Disease", Progress In Inflammatory Bowel Disease, 12:1:6–8 (1991).

Grisham et al., "Neutrophil–Mediated Mucosal Injury. Role of Reactive Oxygen Metabolites", Digestive Diseases and Sciences, 33:6S–15S (1988).

Grisham et al., "Oxidant Defense Mechanisms In The Human Colon", Inflammation, 14:6:669 (1990).

Thornalley et al., "Possible Role for Metallothionein in Protection Against Radiation–Induced Oxidative Stress. Kinetics and Mechanism of its Reaction with Superoxide and Hydroxyl Radicals", Biochimica et Biophysica Acta, 827:36–44 (1985).

Abel et al., "Inhibition of Hydroxyl–Radical–Generated DNA Degradation by Metallothionein", Toxicology Letters, 47:191–196 (1989).

Bakka et al., "Radioresistance in Cells with High Content of Metallothionein", Experentia, 38:381–383 (1982).

Matsubara, "Alteration of Radiosensitivity in Metallothionein Induced Mice and a Possible Role of Zn–Cu–Thionein in GSH–Peroxidase System", Experentia Supplementum, 52:603 (1987).

NUTRITIONAL PRODUCT FOR A PERSON HAVING ULCERATIVE COLITIS

The present invention relates to a nutritional product for a person having ulcerative colitis.

The term "Inflammatory Bowel Disease" is a designation commonly used for two related, but distinct, chronic inflammatory conditions affecting the gastrointestinal tract, namely Crohn's disease and ulcerative colitis. Crohn's disease may involve any segment of the gastrointestinal tract, although characteristically the region of greatest involvement is the distal one quarter of the small intestine and the proximal colon. In ulcerative colitis the inflammation is, by definition, limited to the mucosa of the large bowel. However, the present invention is concerned only with nutritional support for a person having ulcerative colitis. The primary cause of ulcerative colitis is not currently known.

At the present time, there is no medical cure for ulcerative colitis and this chronic condition may lead to total proctocolectomy. Current medical treatment is directed toward decreasing the number, frequency and severity of acute exacerbations of inflammatory bowel disease and preventing secondary complications, but at best, the results are disappointing. Long term use of corticosteroids to downregulate the inflammatory response is a common approach to the control of intestinal inflammation. Steroids are considered to exert their antiinflammatory effects through inhibition of the release of free arachidonic acid from membrane phospholipids. Historically the long term use of immunosuppressive agents (steroids) is associated with chronic side effects such as those presented in Table 1.

Sulfasalazine is widely used to treat victims of ulcerative colitis. Sulfasalazine's pharmacologic effects include alterations in the bacterial flora of the gut, increased colonic absorption of fluids and electrolytes, decreases in the number of B cells, interference with lymphocyte activation and natural killer activity, and inhibition of antibody secretion. The overall usefulness of sulfasalazine has been somewhat undermined by a high degree of intolerance and a frequent occurrence of adverse reactions in the patient population such as those presented in Table 1.

TABLE 1

CURRENT DRUG THERAPIES FOR ULCERATIVE COLITIS
"non-specific therapies"

| DRUG | ADMINISTRATION | SIDE EFFECTS |
|---|---|---|
| Anti-inflammatory agents | | |
| Salicylates | oral, rectal (enemas) | secretory diarrhea, |
| 5-ASA (ROWASA) | | nausea, headache, |
| Sulfasalazine | | anemia, leukopenia |
| Corticosteroids | oral, topical, intravenous | acne, weight gain, peptic ulcer, diabetes, glaucoma, cataracts, osteoporosis, psychosis |
| Immunosuppressive agents | | |
| Azathioprine (AZA) | oral, intravenous | bone marrow |
| 6-mercaptopurine | | suppression, |
| Metronidazole | | infections, |
| Cyclosporine | | pancreatitis |
| Prednisone | | |

Antibiotics are used intermittently, particularly in the presence of severe exacerbations as are other drugs including antispasmodics and anticholinergics. It has been reported by Rosenberg et al., "Nutritional Aspects of Inflammatory Bowel Disease", *ANNUAL REVIEW OF NUTRITION*, Vol. 5, pages 463–484, at 467 (1985) that many drug therapies used in inflammatory bowel diseases may have negative effects on nutritional status. For example, high daily doses of corticosteroids can exert an additional catabolic effect on patients who may already be under stress, and may inhibit calcium absorption by the intestine. Another example of a potentially negative drug-nutrient interaction is the interference with folate absorption by sulfasalazine via a mechanism of competitive inhibition.

Therapy for severe attacks of ulcerative colitis frequently includes special nutritional support, especially when surgical intervention is planned. Total parenteral nutrition was initially used to improve nutritional status, but later was used to enhance "bowel rest" and induce clinical remission to avoid total proctocolectomy. However; Gonzalez-Huix et al., "Enteral versus Parenteral Nutrition as Adjunct Therapy in Acute Ulcerative Colitis", *THE AMERICAN JOURNAL OF GASTROENTEROLOGY*, Vol. 8, No. 2, pages 227–232 (1993) reports the results of a study which suggests that total enteral nutrition is safe and nutritionally effective in severe attacks of ulcerative colitis. This publication suggests total enteral nutrition should be regarded as the most suitable type of nutritional support in these patients. The enteral nutritional product used in this published study was Edanec HN from UNIASA, Granada, Spain which was described in the publication as set forth below in Table 2.

TABLE 2

EDANEC HN

| NUTRIENT | AMOUNT PER 1000 ml |
|---|---|
| Nitrogen (g) | 8.73 |
| Lipids (g) | 36.20 |
| Carbohydrates (g) | 110.20 |
| Energy (Kcal) | 984.85 |
| E/N ratio (nonprotein kcal/g N) | 87.81 |
| Energy source | |
| Nitrogen | Intact milk protein |
| Fat | Long Chain Triglycerides |
| Carbohydrate | Maltodextrins |
| Na (mmol) | 36.00 |
| K (mmol) | 32.00 |
| Calcium (mmol) | 3.00 |
| Magnesium (mmol) | 3.00 |
| Phosphate (mmol) | 12.00 |
| Vitamins | Upper limit of RDA |
| Trace-elements | Upper limit of RDA |

Gonzalez-Huix et al., compared the effects of total enteral nutrition and total parenteral nutrition in patients with acute ulcerative colitis. The final conclusions of their trials were that total parenteral nutrition does not have a primary therapeutic effect on the inflammatory process, and that "bowel rest" is not essential for the management of acute ulcerative colitis. The main reluctance to use enteral feeding in severe ulcerative colitis has been the possibility of worsening diarrhea. Gonzalez-Huix et al. reported that only one patient out of 23 fed enterally developed diet-related diarrhea. Although a regular diet may be well-tolerated in ulcerative colitis, patients tend to reduce food intake unless they are persistently encouraged to eat. In these circumstances, tube feeding has been used to guarantee adequate energy and nutrient supply.

The UNIASA product, Edanec HN, differs considerably from the nutritional product of the present invention. For example, the new product of the present invention has a caloric density of 1.29 kcal/ml while Edanec HN has a caloric density of 0.98 kcal/ml. Our product also is lower in fat, containing approximately 21.9 g Fat/1000 kcal while Edanec HN contains approximately 36.7 g Fat/1000 kcal. The nutritional product of the present invention also contains fish oil as a source of eicosapentaenoic acid (20:5n3) and docosahexaenoic acid (22:6n3) as well as dietary fibers such as gum arabic and indigestible oligosaccharides such as fructooligosaccharides (FOS) and xylooligosaccharides (XOS). These ingredients are crucial for a product developed for a patient with ulcerative colitis.

Ulcerative colitis afflicts persons as young as 5 years old. Onset of symptoms of inflammatory bowel disease occurs before age 20 in about 40% of patients. The biggest problem in the management of ulcerative colitis in young persons is almost invariably poor dietary compliance. It has been observed by Sutton, "Nutritional Needs of Children with Inflammatory Bowel Disease", NUTRITION, Vol. 18, No. 10, pages 21–25 (1992) that deficiencies of micronutrients are individually determined and relate to disease activity and site as well as dietary intake. Sutton recommends a multivitamin/mineral tablet which meets 100–150% of the Recommended Daily Allowance. This publication further reports that: (a) deficiencies of water-soluble nutrients such as folate, $B_{12}$, biotin, vitamin C, niacin, riboflavin, and $B_6$ have been reported in patients who eliminated foods such as milk, fruits and vegetables due to intolerance; (b) deficiencies of fat-soluble nutrients such as vitamins A, E and K have been reported in patients having fat malabsorption due to severe ileac disease or resection; and (c) deficiencies of minerals and trace minerals such as calcium, iron, zinc, copper and chromium, result from inadequate intake and/or reduced absorption.

Similar nutritional deficiencies in inflammatory bowel disease patients have been reported by Rosenberg et al., "Nutritional Aspects of Inflammatory Bowel Disease", *ANNUAL REVIEW OF NUTRITION*, Vol. 5, pages 463–484 (1985). Rosenberg, et al. describe the problems of protein calorie malnutrition and deficiency of micronutrients on gastrointestinal function and structure in these terms: The patient with inflammatory bowel disease who becomes significantly malnourished may enter a vicious cycle where secondary effects of malnutrition or gastrointestinal function and structure may lead to a further increase in gastrointestinal symptoms and malabsorption, which further worsens nutrient balance. In addition, it may be assumed that malnutrition will significantly depress the patient's ability to heal the inflammation and structural changes in the bowel. The overall therapeutic strategy must be to ensure adequate intake of nutrients while modifying dietary intake to decrease gastrointestinal symptoms.

The impact of ulcerative colitis on nutritional status can be highly significant, particularly in the pediatric age group, in whom protein and calorie requirements for growth are not likely to be met by ordinary dietary means. There is increasing evidence that a good therapeutic response can be achieved in ulcerative colitis by dietary treatment alone. Many dietary regimens have fallen short of expectations and have not been uniformly effective in promoting weight gain and wound healing or in maintaining optimal nutritional status in patients with ulcerative colitis.

The features of the present invention which are believed to be novel are set forth with particularity in the appended claims. The present invention may be understood by referring to the following detailed description, taken in accordance with the accompanying drawing FIGS. 1–5, which are all charts presenting the results of experiments relating to the present invention.

The major advantages of using a specially formulated enteral diet to induce remission of active disease include the virtual absence of side effects, possible decreased dosage of prescribed drugs and improved nutritional status of adults and children. In order to understand and evaluate the effects of polymeric diet(s), various nutrients such as n-3 fatty acids, nutrients which function as antioxidants, and short chain fatty acids (SCFAs) must be assessed as to their ability to decrease disease activity in ulcerative colitis and allow for mucosal repair.

Increasing interest has been generated in the use of enemas/irrigation solutions containing buffered, physiologic levels of SCFAs for the treatment of diversion colitis and ulcerative colitis. Diversion colitis is an inflammatory process arising in segments of the colorectum at various intervals after surgical diversion of the fecal stream. The endoscopic appearance is similar to those of active Crohn's Disease and ulcerative colitis. Glotzer et al., "Proctitis and Colitis Following Diversion of the Fecal Stream", *GASTROENTEROLOGY* Vol. 80, pages 438–441 (1981). The cause of this condition is not known, but one mechanism has been postulated; a nutritional deficiency of the colonic epithelium, specifically due to the absence of SCFAs normally present in colonic contents. Komorowski, "Histologic Spectrum of Diversion Colitis" *AMERICAN JOURNAL OF SURGICAL PATHOLOGY*, Vol. 14, page 548 (1990), Roediger, "The Starved Colon—Diminished Mucosal Nutrition, Diminished Absorption, and Colitis", *DISEASES OF THE COLON AND RECTUM*, Vol. 33, pages 858–862 (1990). Harig et al., "Treatment of Diversion Colitis with Short-Chain-Fatty Acid Irrigation", *NEW ENGLAND JOURNAL OF MEDICINE*, Vol. 320, No. 1, pages 23–28 (1989) tested this hypothesis by assessing whether irrigation with SCFAs could ameliorate inflammation in four patients with diversion colitis. These patients were administered SCFAs twice daily for 2–3 weeks with 60 mL of an enema solution comprising a physiologic mixture of SCFAs as sodium salts. After 2–3 weeks of therapy, macroscopic and histological resolution of inflammation was evident. An impaired utilization of SCFAs has also been implicated in ulcerative colitis which suggests that diminished intracellular energy production may be important in the inflammatory process, Roediger, "The Colonic Epithelium in Ulcerative Colitis: an Energy Deficiency Disease", *THE LANCET*, Oct. 4, 1980, pages 712–715. Vernia et al., "Fecal Lactate and Ulcerative Colitis", *GASTROENTEROLOGY*, Vol. 95, pages 1564–1568 (1988); and Vernia et al., "Organic Anions and the Diarrhea of Inflammatory Bowel Disease", *DIGESTIVE DISEASES AND SCIENCES*, Vol. 33, pages 1353–1358 (1988) have shown that fecal water from patients with ulcerative colitis contains reduced concentrations of SCFAs as well as markedly increased lactate and low pH. In a study by Breuer et al., "Rectal Irrigation with Short-Chain Fatty Acids for Distal Ulcerative Colitis" (preliminary report), *DIGESTIVE DISEASES AND SCIENCES*, Vol. 36, pages 185–187 (1991), relates an investigation of large bowel irrigation with SCFAs in patients with ulcerative colitis. It was found that 9 out of 10 patients completing the study were judged to be at least much improved and showed a significant change in mean disease activity index score and mucosal histology score. Recently Senagore et al., "Short-Chain Fatty Acid Enemas: a Cost Effective Alternative in the Treatment of Nonspecific Proctosigmoiditis", *DISEASES OF THE COLON AND RECTUM*, Vol. 35, page 923 (1992), confirmed the results of Breuer et al. demonstrating an 80 percent response rate in patients with idiopathic proctosigmoiditis. This study indicates that administering a solution of SCFAs similar to Harig et al. for six weeks was equally efficacious to corticosteroid or 5-ASA enemas for the treatment of proctosigmoiditis at a significant cost savings. Scheppach et al., "Effect of Butyrate Enemas on the Colonic Mucosa in Distal Ulcerative Colitis", *GASTROENTEROLOGY*, Vol. 103, pages 51–56 (1992) investigated the use of butyrate enemas alone rather than the SCFA mixture to treat ten patients with distal ulcerative colitis in a placebo-controlled, single-blind, randomized trial. The authors concluded that markedly improved disease activity index and histological parameters suggesting that the effect of a SCFA mixture on the inflamed mucosa in ulcerative colitis is largely attributable to its butyrate moiety.

It is unlikely that short chain fatty acids added directly to an enteral product would reach the large bowel. Also, the stability of these compounds in a nutritional product is questionable. However, the nutritional product of the present invention takes advantage of the positive effect of SCFAs by providing dietary fiber or indigestible oligosaccharides.

For the purpose of the patent the following terms are defined as follows:

Dietary Fiber—A material that contains a large carbohydrate moiety (Degree of polymerization greater than 20 and/or a molecular weight greater than 3,600) that is resistant to endogenous digestion in the human upper digestive tract.

Indigestible Oligosaccharide—A small carbohydrate moiety (Degree of polymerization less than 20 and/or a molecular weight less than 3,600) that is resistant to endogenous digestion in the human upper digestive tract.

Indigestable Carbohydrate—A term used to encompass both dietary fiber and indigestible oligosaccharides.

Certain of the organisms that inhabit the large bowel can utilize dietary fiber (eg, pectin and gum arabic) and indigestible oligosaccharides (eg, fructooligosaccharides and xylooligosaccharides) as an energy source. Smith et al., "Introduction to Metabolic Activities of Intestinal Bacteria", *AMERICAN JOURNAL OF CLINICAL NUTRITION*, Vol. 32, pages 149–157 (1979); Miller et al., "Fermentation by Saccharolytic Intestinal Bacteria", *AMERICAN JOURNAL OF CLINICAL NUTRITION*, Vol. 32, pages 164–172 (1979); Cummings., "Fermentation in the Human Large Intestine: Evidence and Implications for Health", *THE LANCET*, May 28, 1983 pages 1206–1209 Titgemeyer et al., "Fermentability of Various Fiber Sources by Human Fecal Bacteria In Vitro", *AMERICAN JOURNAL OF CLINICAL NUTRITION*, Vol. 53, pages 1418–1424 (1991). The microorganisms derive energy from the carbohydrate sources through a process referred to as anaerobic fermentation. During fermentation, the microorganisms produce SCFAs (eg, acetate, propionate, butyrate) as the major end products. Salyers et al., "Fermentation of Mucin and Plant Polysaccharides by Strains of Bacteroides from the Human Colon", *APPLIED AND ENVIRONMENTAL MICROBIOLOGY*, Vol. 33, No. 2, pages 319–322 (1977); Mitsuoka et al., "Effect of Fructo-oligosaccharides on Intestinal Microflora", *DIE NAHRUNG*, Vol. 31, pages 427–436 (1987); Tokunaga et al., "Influence of Chronic Intake of New Sweetener Fructooligosaccharide (Neosugar) on growth and Gastrointestinal Function of the Rat", *JOURNAL OF NUTRITIONAL SCIENCE AND VITAMINOLOGY*, Vol. 32, pages 111–121 (1986).

As an indirect source of SCFAs, dietary fiber and indigestible oligosaccharides (indigestable carbohydrate) can elicit certain metabolic benefits. Total parenteral nutrition (TPN) or the administration of a fiber free liquid diet leads to reduced colonic cell proliferation and atrophy. Janne et al., "Colonic Mucosal Atrophy Induced by a Liquid Elemental Diet in Rats", *DIGESTIVE DISEASES*, Vol. 22, No. 9, pages 808–812 (1977); Morin et al., "Small Intestinal and Colonic Changes Induced by a Chemically Defined Diet", *DIGESTIVE DISEASES AND SCIENCES*, Vol 25, No. 2 pages 123–128 (1980); Sircar et al., "Effect of Synthetic Diets on Gastrointestinal Mucosal DNA Synthesis in Rats", *AMERICAN JOURNAL OF PHYSIOLOGY*, Vol. 244, pages G327-G335 (1983); Ryan et al., "Effects of Various Diets on Colonic Growth in Rats", *GASTROENTEROLOGY*, Vol. 77, pages 658–663 (1979); Storme et al., "The Effects of a Liquid Elemental Diet on Cell Proliferation in the Colon of rats", *CELL AND TISSUE RESEARCH*, Vol. 216, pages 221–225 (1981). Such atrophy could be prevented with the use of indigestible carbohydrate. Indigestible carbohydrate, through the production of SCFAs during their fermentation, can stimulate colonic epithelial cell proliferation. Goodlad et al., "Proliferative Effects of Fibre on the Intestinal Epithelium", *GUT*, Vol. 28 pages 221–226 (1987); Kripke et al., "Stimulation of Intestinal Mucosal Growth with Intracolonic Infusion of Short-Chain fatty Acids", *JOURNAL OF PARENTERAL AND ENTERAL NUTRITION*, Vol. 13, No. 2, pages 109–116 (1989); Scheppach et al., "Effect of Short-chain Fatty Acids on the Human Colonic Mucosa In Vitro", *JOURNAL OF PARENTERAL AND ENTERAL NUTRITION*, Vol. 16, No. 1 pages 43–48 (1992); Sakata., "Stimulatory Effect of Short-chain Fatty Acids on Epithelial Cell Proliferation in the Rat Intestine: A Possible Explanation for Trophic Effects of Fermentable Fibre, Gut Microbes and Luminal Trophic Factors", *BRITISH JOURNAL OF NUTRITION*, Vol. 58, pages 95–103 (1987); Thomas et al., "Effect of enteral Feeding on Intestinal Epithelial Proliferation and fecal Bile Acid Profiles in the Rat", *JOURNAL OF PARENTERAL AND ENTERAL NUTRITION*, Vol. 17, No. 3 pages 210–213 (1993). A recent animal study also has demonstrated the benefit of an indigestible carbohydrate in the treatment of experimental colitis. Rolandelli et al., "Comparison of Parenteral Nutrition and Enteral Feeding with Pectin in Experimental Colitis in the Rat", *AMERICAN JOURNAL OF CLINICAL NUTRITION*, Vol. 47, pages 15–21 (1988). Specifically, the degree of bowel injury in experimental colitis was decreased when rats were fed an enteral diet supplemented with pectin, which is a dietary fiber. Improvements in outcome may have been due to the SCFAs produced during the fermentation of pectin.

EXPERIMENT 1

Figure 1:
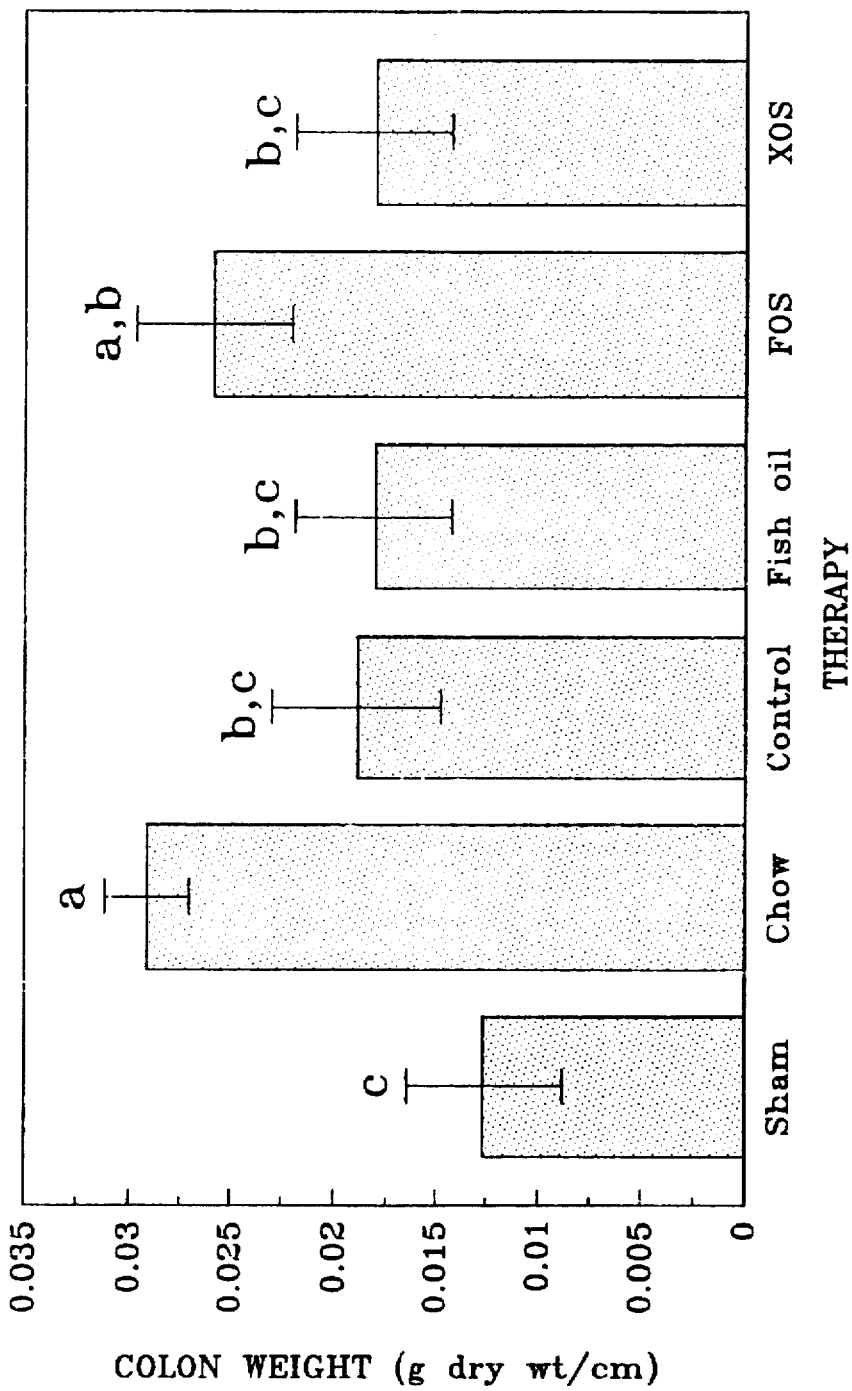
FIG. 1 Comparison of enteral diets and their effects on rat colon weight.

In the first experiment the objective was to determine short chain fatty acid production from a variety of indigestible oligosaccharides during fermentation with mixed human fecal microbiota. Several indigestible oligosaccharides were tested including FOS, Raftilose® and XOS. FOS is a fructooligosaccharide produced on a commercial scale by fermenting granulated sucrose in water with a pure strain of *Aspergillus niger*. The organism produces a fructosyltransferase enzyme which links additional fructose units onto the fructose end of sucrose molecules to produce 1-kestose ($GF_2$), nystose ($GF_3$) and $1^F$-B-fructo-furanosylnystose ($GF_4$). Raftilose® is a fructooligosaccharide produced via enzymatic hydrolysis of inulin, which is marketed by Rhone-Poulenc (Raffinerie Tirlemontoise SA). The hydrolysis results in a wide array of oligosaccharides such as $GF_2$, $GF_3$ and $GF_4$ as well as oligosaccharides containing just fructose ($F_3$, $F_4$, $F_5$, etc.). XOS is a xylooligosaccharide produced via enzymatic hydrolysis of xylan. The primary ingredients of XOS are xylobiose, xylotriose and xylotetrose.

The fermentation medium used in this first experiment is described in Table 3, and the anaerobic dilution solution used in this experiment is described in Table 4.

TABLE 3

IN VITRO FERMENTATION MEDIUM COMPOSITION[a]

| INGREDIENT | AMOUNT (%) |
|---|---|
| Substrate (w/v) | 1.0 |
| Salts A[b] (v/v) | 33.0 |
| Salts B[c] (v/v) | 33.0 |
| Salts SL6[d] (v/v) | 1.0 |
| Vitamin mix[e] (v/v) | 2.0 |
| Hemin Solution[f] (v/v) | 0.25 |
| Resazurin solution[g] (v/v) | 0.10 |
| Yeast extract (w/v) | 0.05 |
| Trypticase (w/v) | 0.05 |
| $Na_2CO_3$ (w/v) | 0.40 |
| cysteine HCl $H_2O$ (w/v) | 0.05 |
| SCFA mix[h] (v/v) | 0.04 |
| d $H_2O$ (v/v) | 31.88 |

[a]Media will be prepared as follows. All ingredients except substrate, vitamin mix, $Na_2CO_3$, cysteine HCl and SCFA mix will be dissolved via boiling and then cooled to <50° C. through bubbling with $CO_2$. $Na_2CO_3$ and the SCFA mix will then be added and bubbled with $CO_2$ until the solution is 30° C. Substrate will then be added and the solution autoclaved for 15 min at 121° C. (15 psi). Cysteine HCl and the vitamin mix will be added to the solution prior to dispensing.
[b]NaCl, 27.0 g; $KH_2PO_4$, 13.5 g; $CaCl_2.H_2O$, 0.8 g; $MgCl.6H_2O$, 0.6 g; $MnCl_2.4H_2O$, 0.3 g; $CoCl_2.6H_2O$, 0.3 g; $(NH_4)_2SO_4$, 27.0 g; d $H_2O$, 5.0 l.
[c]$K_2HPO_4$, 13.5 g; d $H_2O$, 5.0 L.
[d]EDTA disodium salts, 0.25 g; $FeSO_4.7H_2O$, 0.1 g; d $H_2O$, 450 ml; Minerals SL6 solution, 50 ml ($ZnSO_4.7H_2O$, 0.04 g; $MnCl_2.4H_2O$, 0.012; $H_3PO_4$, 0.12 g; $CoCl_2.6H_2O$, 0.08 g; $CuCl_2$ $2H_2O$, 0.004 g; $NiCl_2.6H_2O$, 0.008 g; $Na_2MoO_4.2H_2O$, 0.012 g; d $H_2O$, 400 ml).
[e]Thiamine-HCl, 0.05 g; pantothenic acid, 0.05 g; niacin, 0.05 g; pyridoxine, 0.05 g; riboflavin, 0.05 g; folic acid, 1.25 mg; biotin 1.25 mg; PABA, 2.5 mg; Vitamin $B_{12}$, 0.125 mg; d $H_2O$, 495 ml; Vitamin $K_1$ solution, 5.0 ml (vitamin $K_1$, 125 μl; 95% ethanol, 25.0 ml).
[f]hemin, 50 mg; 1N NaOH, 1 ml; d $H_2O$, 99 ml.
[g]See Table 4
[h]N-valeric acid, 0.2 ml; isovaleric acid, 0.2 ml; isobutyric acid, 0.2 ml; DL-α-methylbutyric acid, 0.2 ml.

TABLE 4

ANAEROBIC DILUTION SOLUTION[a]
(1 Liter)

| INGREDIENT | AMOUNT |
|---|---|
| Mineral solution1[b] | 37.5 ml |
| Mineral solution2[c] | 37.5 ml |
| Resazurin solution (.1% w/v)[d] | 1.0 ml |
| $NaHCO_3$ | 6.37 g |

TABLE 4-continued

ANAEROBIC DILUTION SOLUTION[a]
(1 Liter)

| INGREDIENT | AMOUNT |
|---|---|
| d $H_2O$ (sonicated) | 924.0 ml |
| cysteine $HCl.H_2O$ | 0.5 g |

[a]Mix minerals 1 and 2, resazurin and water, saturate with carbon dioxide, and add $NaHCO_3$ and autoclave. Add 0.5 g of cysteine HCl to cooled solution.
[b]$K_2HPO_4$, 0.6 g; Na Citrate.$2H_2O$, 0.2 g; d $H_2O$, 100 ml.
[c]NaCl, 1.2 g; $(NH_4)SO_4$, 1.2 g; $KH_2PO_4$, 0.6 g; $CaCl_2$, 0.12 g; $MgSO_4.7H_2O$, 0.25 g; Na Citrate.$2H_2O$, 2 g; d $H_2O$ 100 ml; (dissolve salts in $H_2O$ in above order).
[d]Resazurin, 0.05 g; d $H_2O$, 50 ml.

The indigestible oligosaccharides were fermented in vitro for 3, 6, 12, and 24 hours with mixed human fecal microbiota. McBurney et al., "Effect of Human Faecal Inoculum on In Vitro Fermentation Variables", BRITISH JOURNAL OF NUTRITION, Vol.58, pages 233–243, (1987). Fermentations were repeated with 3 donors because this is the minimal number required to make accurate extrapolations to the general population. McBurney et al., "Effect of Human Faecal Donor on In Vitro Fermentation Variables", SCANDINAVIAN JOURNAL OF GASTROENTEROLOGY, Vol. 24, pages 359–367, (1989). Briefly, a 0.115 g sample (dry weight) was weighed into a balch tube. Approximately 24 hours before the start of the incubation 10 mL of the fermentation medium described in Table 3 was added to the samples so that the samples were hydrated when the inoculum was added. The redox potential of the contents of the tubes was reduced, the tubes were capped with one-way valves and stored overnight in the refrigerator. One to two hours before inoculation, the tubes were placed in a 37° C. water bath.

Fresh human feces was collected from three healthy individuals. Each fecal sample was collected into a plastic bag. Air was expressed from the bag and an aliquot taken and mixed (blended under $CO_2$) with the anaerobic dilution solution described in Table 4 (40 g feces/360 mL anaerobic dilution solution; 1×10). The solution was filtered through 2 layers of cheese cloth and the filtrate served as inoculum. One milliliter of this inoculum was injected into each tube. Tubes were swirled at regular intervals. The fermentation was terminated at the appropriate time point (h) by opening the tubes and adding 2 mL 25% m-phosphoric acid.

Analysis of acetate, propionate and butyrate was conducted according to Merchen et al., "Effect of Intake and Forage Level on Ruminal and Turnover Rates, Bacterial Protein Synthesis and Duodenal Amino Acid Flows in Sheep", JOURNAL OF ANIMAL SCIENCE, Vol. 62, pages 216–225 (1986). Briefly, an aliquot from the balch tube was acidified with 6N HCl and centrifuged at 31,000×g for 20 minutes Concentrations of acetate, propionate and butyrate were determined in the supernatant using a Hewlett-Packard 5890A gas chromatograph and a column (180 cm×4 mm id) packed with 20% Tween 80–2% $H_3PO_4$ on 60 to 80 mesh Chromosorb W (Supelco Inc. Bellefonte, Pa., U.S.A.). Nitrogen was used as a carrier gas with a flow rate of 70 mL/minutes. Oven temperature was 120° C. and detector and injector temperatures were 200° C. Lactate was determined calorimetrically using a method described in Barker et al., "The Colorimetric Determination of Lactic Acid in Biological Material", JOURNAL OF BIOLOGICAL CHEMISTRY, Vol. 138, page 535, (1941).

The experiment was analyzed as a randomized complete block with fecal donor serving as the block. Treatments, which were arranged factorially, included substrate and length of fermentation. All analyses were performed using the General Linear Models procedure of Statistical Analysis Systems (SAS). Least significant difference (LSD) values for separating treatment means at P<0.05 was 2.83 times the standard error of the mean (SEM).

SCFA production (acetate, propionate, butyrate and lactate) during in vitro fermentation of the oligosaccharides is presented in Table 3. Four time points were studied and include 3, 6, 12 and 24 hours. Retention time in the large bowel of humans will dictate the length of fermentation in vivo. In cases where retention time is great, the extent of substrate fermentability will be a factor which most influences SCFA production. If retention time is short, the rate of substrate fermentation becomes more important. Since retention times can differ significantly in an in vivo situation it is necessary to monitor substrate degradation over time in vitro in order that comparisons can be made.

Fermentation of all oligosaccharides was rapid, essentially being complete by 6 hours for the fructooligosaccharides (FOS and Raftilose) and by 12 hours for XOS. The results are presented in Table 5. It is recommended that the 6 hour and 12 hour values be used to estimate the composition of the end-products for the fructooligosaccharides and the XOS, respectively, even though retention times in the large bowel can be considerably longer. At later time points it becomes apparent that lactate is being converted to propionate and acetate to butyrate. Interconversion in a closed in vitro system can be a problem with rapidly fermented substrates. It does not reflect the true state of the large bowel where the fatty acids are continually absorbed.

TABLE 5

SHORT CHAIN FATTY ACID PRODUCTION
DURING 3, 6, 12 AND 24 H in vitro
FERMENTATION OF VARIOUS OLIGOSACCHARIDES

| | | SHORT CHAIN FATTY ACID[a] | | | | |
|---|---|---|---|---|---|---|
| SUB-STRATE | HOUR | Acetate | Propionate | Butyrate | Lactate | Total SCFA[b] |
| FOS | 3 | 1.49 | .20 | .23 | .45 | 2.37 |
| | 61 | 3.61 | .54 | .87 | 1.19 | 6.21 |
| | 12 | 3.67 | 1.01 | 1.64 | .54 | 6.86 |
| | 24 | 3.20 | 1.09 | 2.09 | .01 | 6.39 |
| Raftilose ® | 3 | 1.42 | .20 | .27 | .47 | 2.36 |
| | 6 | 3.49 | .53 | .92 | 1.28 | 6.22 |
| | 12 | 3.68 | .98 | 1.70 | .59 | 6.95 |
| | 24 | 3.09 | 1.05 | 2.1 | .01 | 6.30 |
| XOS | 3 | 1.21 | .15 | .13 | .14 | 1.63 |
| | 6 | 4.12 | .58 | .58 | .47 | 5.75 |
| | 12 | 5.90 | .97 | 1.1 | .74 | 8.72 |
| | 24 | 5.53 | .96 | 1.5 | .05 | 8.10 |
| Statistics | SEM | .13 | .08 | .08 | .08 | |
| | LSD[c] | .37 | .23 | .23 | .23 | |

[a]Calculated as (mmol fatty acid in incubation tube minus mmol fatty acid in blank tube) divided by original substrate dry matter (DM) and expressed as mmol/g substrate DM.
[b]Sum of acetate + propionate + butyrate + lactate and expressed as mmol/g substrate DM.
[c]Differences between mean values within a column greater than the specified LSD are significantly different P < .05.

As is typically found with in vitro fermentations using human fecal inoculum or in analysis of fecal samples, acetate was the short chain fatty acid found in the highest concentration. Titgemeyer et al., "Fermentability of Various Fiber Sources by Human Fecal Bacteria In Vitro", *AMERICAN JOURNAL OF CLINICAL NUTRITION*, Vol. 53, Pages 1418–1424, (1991). Baldwin., "Energy Metabolism in Anaerobes", *AMERICAN JOURNAL OF CLINICAL NUTRITION*, Vol. 23, No. 11, pages 1508–1513, (1970) determined that acetate, propionate and butyrate account for 83% of the SCFAs produced during anaerobic fermentation by large bowel microflora, and the remaining SCFAs are distributed among isovaleric, isobutyric, valeric, lactic, formic and succinic acids. In this study, a considerable amount of lactate was found, particularly during fermentation with FOS and Raftilose. It has been documented that the oligosaccharides used in this study serve as an energy source for Bifidobacteria and that there consumption will lead to the selective growth of this organism in the GI tract. Okazaki et al., "Effects of Xylooligosaccharides on the Growth of Bifidobacteria", *BIFIDOBACTERIA MICROFLORA*, Vol. 9, No. 2 page 77, (1990); Mitsuoka et al., "Effects of Fructooligosaccharide on Intestinal Microflora", *DIE NAHRUNG*, Vol. 31, pages 427–436, (1987). The primary end products produced by Bifidobacteria during fermentation are acetate and lactate. Miller et al., "Fermentations by Saccharolytic Intestinal Bacteria", *AMERICAN JOURNAL OF CLINICAL NUTRITION*, Vol. 32, pages 164–172, (1979). The fact that these oligosaccharides serve as an energy source for the Bifidobacteria could explain the elevated levels of lactate found in this study.

Total short-chain fatty acid production was greater for the xylooligosaccharides (XOS) compared to the fructooligosaccharides (FOS and Raftilose). The primary factor effecting the quantity of SCFAs produced during fermentation is the fermentability of the substrate. It is assumed that the oligosaccharides are completely fermented in this system. However, the yield of SCFAs (mol) from a substrate is dependent not only on the weight of the substrate fermented but also on the average molecular weight of the oligosaccharide component sugars. One can assume that the fermentation of one monosaccharide molecule can result in either two acetate, two propionate, two lactate or one molecule of butyrate. The molecular weight of the components of the fructooligosaccharides (glucose and fructose, 180) is greater than the molecular weight of xylose (150) which is the monomeric component of XOS. Subsequently, on an equivalent weight basis, there are more moles of monosaccharide molecules with the xylooligosaccharide compared to the fructooligosaccharide. This would explain the greater production of SCFA with the XOS compared to the fructooligosaccharides. Lastly, the quantity and profile of SCFAs produced was virtually identical between the two fructooligosaccharides (Raftilose and FOS). While these fructooligosaccharides differ to some extent in their chemical composition, it is apparent that they are metabolized similarly in this in vitro fermentation system.

In Experiment 1, the in vitro fermentability of three indigestible oligosaccharides was evaluated. Fermentation of the indigestible oligosaccharides was rapid and essentially complete by 12 hours. Such compounds may serve as an indirect energy source, particularly for the large bowel. By serving as an energy source the oligosaccharides may be useful in preventing large bowel atrophy associated with the feeding of semi-elemental and elemental diets. Through the production of SCFAs, the indigestible oligosaccharides also may be useful in the treatment of inflammatory bowel disease (ulcerative colitis). Also, considering their ability to serve as energy substrates for the anaerobic flora of the large bowel, particularly the Bifidobacteria, these compounds may be useful in promoting the restoration of normal flora following antibiotic therapy or maintaining a normal flora in patients consuming enteral diets. This may enhance colonization resistance to pathogens such as *C. difficile*. It is believed to be an important feature of the nutritional product of the present invention that it contains a source of indigestible carbohydrate which is metabolized to SCFAs by microorganisms present in the human colon and which comprise at least one material selected from the group consisting of dietary fibers and indigestible oligosaccharides.

It is commonplace in western cultures for the predominant sources of lipids in the diet to be vegetable sources, such as corn or sunflowers, which provide relatively high amounts of linoleic acid (18:2n6). Linoleic acid can be metabolized to arachidonic acid (20:4n6) and hence to dienoic eicosanoids, such as prostaglandin $E_2$ ($PGE_2$), thromboxane $A_2$ ($TxA_2$), and leukotriene $B_4$ ($LTB_4$). On the other hand, the predominant polyunsaturated fatty acids present in fish oils are eicosapentaenoic acid (20:5n3) and docosahexaenoic acid (22:6n3). Eicosapentaenoic acid (20:5n3), which is not present in vegetable oils, has been shown to be metabolized to a family of trienoic eicosanoids, for example, prostaglandin $E_3$ ($PGE_3$), thromboxane $A_3$ ($TxA_3$) and also leukotriene $B_5$ ($LTB_5$) which have biological properties that are subtly different from those of the arachidonic acid (20:4n6) metabolites.

Although the primary etiology of ulcerative colitis is unknown, growing evidence supports a pathogenetic role of arachidonic acid derived inflammatory mediators in this disorder. Eicosanoid formation is increased in specimens from human diseased tissues. Sharon et al., "Role of Prostaglandins in Ulcerative Colitis. Enhanced production during Active Disease and Inhibition by Sulfasalazine", GASTROENTEROLOGY, Vol. 75, No. 4 pages 638–640 (1978); Ligumsky et al., "Enhanced Thromboxane $A_2$ and Prostacylcin Production by Cultured Rectal Mucosa in Ulcerative Colitis and its Inhibition by Steroids and Sulfasalazine", GASTROENTEROLOGY, Vol. 81, pages 444–449 (1981); Sharon et al., "Enhanced Synthesis of Leukotrine $B_4$ by Colonic Mucosa in Inflammatory Bowel Disease", GASTROENTEROLOGY, Vol. 86, pages 453–460 (1984). Luminal eicosanoid release measured in vivo in patients with active ulcerative rectocolitis is enhanced. Lauristen et al., "In Vivo Effects of Orally Administered Prednisolone on Prostaglandin and Leukotriene Production in Ulcerative Colitis", GUT, Vol. 28 pages 1095–1099 (1987); Lauritsen et al., "In Vivo Profiles of Eicosanoids in Ulcerative Colitis, Crohn's Colitis and Clostridium Difficile Colitis", GASTROENTEROLOGY, Vol. 95, pages 11–17 (1988). Furthermore, animal and clinical work from a number of laboratories suggests that elevated levels of leukotriene $B_4$, thromboxane and platelet activating factor participate in the development of chronic lesions. Seidman, "Nutritional Management of Inflammatory Bowel Disease", GASTROENTEROLOGY CLINICS OF NORTH AMERICA, Vol. 17, No. 1 pages 129–155 (1989); Dudrick et al., "Nutritional Management of Inflammatory Bowel Disease", SURGICAL CLINICS OF NORTH AMERICA, Vol. 71, No. 3, pages 609–623 (1991); Teahon et al., "The Role of Enteral and Parenteral Nutrition in Crohn's Disease and Ulcerative Colitis", PROGRESS IN INFLAMMATION BOWEL DISEASE, Vol. 12, No. 2, pages 1–4 (1991); Vilaseca et al., "Participation of Thromboxane and Other Eicosanoid Synthesis in the Course of Experimental Inflammatory Colitis", GASTROENTEROLOGY, Vol. 98, pages 269–277 (1990).

Local eicosanoid generation by the gastrointestinal mucosa is modulated by intraluminal, neural and hormonal factors. Among the intraluminal factors, the diet might have a significant relevance in the regulation of mucosal eicosanoid biosynthesis, since the dietary intake of precursor fatty acids could directly influence the rate and pattern of eicosanoid generation. Within the gastrointestinal tract, prostaglandins derived from arachidonic acid have potent pro-inflammatory actions and can alter motility, fluid secretion and electrolyte transport. Donowitz, "Arachidonic Acid Metabolites and Their Role in Inflammatory Bowel Disease. An Update Requiring Addition of a Pathway", GASTROENTEROLOGY, Vol. 88, pages 580–587 (1985). In contrast, the lipoxygenase metabolites (leukotrienes) stimulate locomotion, superoxide production, lysosomal enzyme release in leukocytes, and colonic chloride secretion. Musch et al., "Stimulation of Colonic Secretion by Lipoxygenase Metabolites of Arachidonic Acid", SCIENCE (Washington, DC), Vol. 17, pages 1255–1256 (1982); Palmer et al., "Chemokinetic Activity of Arachidonic Acid Lipoxygenase Products on Leukocytes from Different Species", PROSTAGLANDINS, Vol. 20, No. 2, pages 411–448 (1980); Stenson et al., "Monohydroxyeicosatetraenoic Acids (HETE's) Induce Degranulation of Human Neutrophils", JOURNAL OF IMMUNOLOGY, Vol. 124, No. 5 pages 2100–2104 (1980). These products of arachidonate metabolism are thus potential mediators of ulcerative colitis and may account for alterations in intestinal fluid and electrolyte secretion.

Recent evidence that the regular intake of n-3 fatty acids from fish oil inhibits neutrophil and monocyte functions suggests that n-3 fatty acids have antiinflammatory properties. Beneficial effects of marine lipids have been shown in animal models of inflammatory bowel disease. Empey et al., "Fish Oil-Enriched Diet is Mucosal Protective Against Acetic Acid-Induced Colitis in Rats", CANADIAN JOURNAL OF PHYSIOLOGY AND PHARMACOLOGY, Vol. 69, pages 480–487 (1991); Vilaseca et al., "Dietary Fish Oil Reduces Progression of Chronic Inflammatory Lesions in a Rat Model of Granulomatous Colitis", , GUT, Vol. 31, page 539 (1990). In preliminary therapeutic trials, diet supplementation with fish oil has led to symptomatic improvement of patients with ulcerative colitis, and reduced ethanol-induced damage in human duodenal mucosa. Schepp et al., "Fish Oil Reduces Ethanol-Induced Damage of the Duodenal Mucosa in Humans", EUROPEAN JOURNAL OF CLINICAL INVESTIGATION, Vol. 21, pages 230–237 (1991) Lorenz et al., "Supplementation with n-3 Fatty Acids from Fish Oil in Chronic Inflammatory Bowel Disease", JOURNAL OF INTERNAL MEDICINE SUPPLEMENT, Vol. 225, pages 225–232 (1989); Hillier et al., "Incorporation of Fatty Acids from Fish Oil and Olive Oil into Colonic Mucosal Lipids and Effects Upon Eicosanoid Synthesis in Inflammatory Bowel Disease", GUT, Vol. 32, pages 1151–1155 (1991); Saloman et al., "Treatment of Ulcerative Colitis with Fish Oil N-3-w-Fatty Acid: An Open Trial", JOURNAL OF CLINICAL GASTROENTEROLOGY, Vol. 12, No. 2, pages 157–161 (1990).

When abundant n-3 fatty acids in the form of fish oil are included in the diet, eicosapentaenoic (EPA) and docosahexaenoic acid may inhibit the synthesis of arachidonic acid from linoleic acid, reduce plasma levels of arachidonic acid by competing for incorporation into membrane phospholipids, and compete with arachidonic acid as a substrate for cyclooxygenase, and to a greater extent, lipoxygenase metabolism. Production of the 2-series prostaglandins ($PGE_2$, $TXB_2$), and the 4-series leukotrienes ($LTB_4$, $LTC_4$) are thus diminished, and the less biologically active 3-series prostaglandins ($PGE_3$, $TXB_3$) and 5-series leukotrienes ($LTB_5$, $LTC_5$) are formed. It is through these mechanisms that dietary fish oils are thought to manifest their antiinflammatory effects.

Fretland et al., "Eicosanoids and Inflammatory Bowel Disease: Regulation and Prospects for Therapy", PROS- TAGLANDINS LEUKOTRINES AND ESSENTIAL FATTY ACIDS, Vol. 41, pages 215–233, at pages 224–225 (1990) relate that in a small uncontrolled pilot study of ulcerative colitis patients given fish oil capsules (Max EPA) containing 3–4 grams of EPA daily for twelve weeks showed significant improvement in symptoms and histological appearance of the rectal mucosa by the end of the treatment period. Neutrophil $LTB_4$ levels fell significantly during the treatment. The Max EPA also contained some vitamin E, a compound with antioxidant and antiinflammatory properties, which could conceivably have accounted for some of the therapeutic effect. Dietary vitamin E supplementation however, was shown not to promote changes in eicosanoid levels obtained from rectal dialysate fluid of active ulcerative colitis patients in a separate study.

EXPERIMENT 2

A major limitation in investigating the pathogenic mechanisms responsible for the mucosal injury observed during chronic inflammation of the intestine and colon has been the relative paucity of relevant animal models. Two models of colitis produced in rats that have received much attention over the past few years are the acetic acid and trinitrobenzene sulfonic acid (TNBS) models. The mechanism by which acetic acid produces the diffuse colitis is thought to involve nonspecific, acid induced injury to the colonic mucosa that is followed by an acute inflammatory response. Apparently the protonated form of the acid is required to induce the colitis since neither HCl (pH 2.3) nor sodium acetate (pH 7.0) is effective in eliciting the inflammatory response. However, there is some evidence to suggest that acetic acid may promote other pathophysiological events (e.g. fluid and electrolyte secretion) using noncytotoxic concentrations of the acid.

Recent studies have demonstrated that the intrarectal administration of the hapten, TNBS, in the presence of a mucosal barrier breaker such as ethanol, produces an acute and possibly chronic colitis in unsensitized rats. The mechanism(s) by which buffered or unbuffered TNBS in the presence of ethanol initiates inflammation in unsensitized animals is unclear; however, it has been suggested to involve macrophage-mediated recognition and lysis of TNBS-modified autologous cells within the mucosa. However, more recent evidence suggests more complicated mechanisms. For example, the barrier breaker, ethanol, is an extremely potent pro-inflammatory solvent alone. Furthermore, it has been demonstrated that TNBS is metabolized by certain colonic enzymes and substrates to yield both pro-inflammatory and cytotoxic oxidants that could initiate colonic inflammation. Grisham et al., "Metabolism of Trinitrobenzene Sulfonic Acid by the Rat Colon Produces Reactive Oxygen Species", GASTROENTEROLOGY, Vol. 101, pages 540–547 (1991). A recent study directly compared the acetic acid and the TNBS (+ETOH) models of colitis and found that either model may be useful to study those events that occur at the time of inflammation (e.g. arachidonate metabolism, granulocyte infiltration and metabolism, etc.) or during repair. However, the use of these models of colitis may have significant limitations in understanding those immunological events that initiate the acute and chronic inflammatory episodes. For example, the inflammation and tissue injury observed in human inflammatory bowel disease is most probably a result of inappropriate immunological activation (e.g. autoimmune, infectious agent, etc.) whereas the inflammation induced by the intrarectal application of acetic acid, ethanol or ethanol plus TNBS is a response to extensive mucosal injury. Thus, the mechanisms by which inflammation (and mucosal injury) are achieved in the human disease may be very different than those in the experimental models.

For these reasons, a model of acute and chronic distal colitis in rats was developed based upon a previously published method in which purified bacterial cell wall polymers (derived from Group A streptococci) are injected intramurally into the distal colon of genetically-susceptible rats. Sartor et al., "Granulomatous Entercolitis Induced by Purified Bacterial Cell Wall Fragments", GASTROENTEROLOGY, Vol. 89, pages 587–595 (1985). This model produces an acute and chronic inflammation characterized by the infiltration of large numbers of inflammatory cells, enhanced mucosal permeability, interstitial fibrosis, and mucosal thickening as well as the extraintestinal manifestations of arthritis, hepatic and splenic granulomas. Unlike most models of colitis, the inflammation induced in this model promoting mucosal and submucosal injury rather than the injury causing the inflammation.

In Experiment 2 the objectives were: (a) to determine whether this model of colitis responds to sulfasalazine (SAZ) and (b) to assess the effects of specially formulated enteral diets on the injury and inflammation observed in the colon, liver and spleen.

Female Lewis rats (150–175 g) were maintained in a controlled temperature and light-dark cycle (12 hours: 12 hours) and housed in wire-mesh bottomed cages and given water and standard laboratory rat chow ad libitum. A total of 48 rats were divided into 6 groups of 8 rats each consisting of a sham (rats receiving Diet #1 (base diet) with no peptidoglycan/ polysaccharide (PG/PS) injection) control group, a chow group and 4 groups of rats placed on 4 different polymeric diets (Table 6). Rats received either chow or polymeric diets (320 kcals/kg/day or 60 mL of liquid diet/day) for 7 days preceding induction of colitis. Distal colitis was induced by a modification of the method of Sartor et al in which multiple sites (8–9) along the distal colon were injected intramurally with 60 ul/site to deliver a dose of peptidoglycan/polysaccharide (PG/PS) of 12.5 ug/g body weight. The albumin (sham) control group received the same number of injections of human serum albumin into the distal colon.

TABLE 6

INFLAMMATORY BOWEL DISEASE FORMULATIONS
(Formulations expressed as percentage of calories)

| Diet[a] | Lipid[b] 18.0% | Carbohydrate 61.0% | Protein 21.0% | Fiber[c] 4.5 g |
|---|---|---|---|---|
| Control | 14.7% corn oil 2.7% MCT 0.6% soy lecithin | 42.7% hydrolyzed cornstarch 18.3% sucrose | 16.0% caseinates 5.0% hydrolyzed soy[d] | None |

TABLE 6-continued

INFLAMMATORY BOWEL DISEASE FORMULATIONS
(Formulations expressed as percentage of calories)

| Diet[a] | Lipid[b] 18.0% | Carbohydrate 61.0% | Protein 21.0% | Fiber[c] 4.5 g |
|---|---|---|---|---|
| Fish oil | 1.6% canola oil<br>11.7% fish oil<br>2.7% MCT<br>1.4% soybean oil<br>0.6% soy lecithin | 42.7% hydrolyzed cornstarch<br>18.3% sucrose | 16.0% caseinates<br>5.0% hydrolyzed soy | None |
| FOS | 14.7% corn oil<br>2.7% MCT<br>0.6% soy lecithin | 42.7% hydrolyzed cornstarch<br>18.3% sucrose | 16.0% caseinates<br>5.0% hydrolyzed soy | 2.25 g FOS<br>2.25 g gum arabic |
| XOS | 14.7% corn oil<br>2.7% MCT<br>0.6% soy lecithin | 42.7% hydrolyzed cornstarch<br>18.3% sucrose | 16.0% caseinates<br>5.0% hydrolyzed soy | 2.25 g XOS<br>2.25 g gum arabic |

[a]The caloric density of all diets is 1.2 kcal/mL. The nutrient base is 1250 kcal. As used herein "nutrient base" means the amount of calories of a product that must be consumed to provide 100% of the US RDA of vitamins and minerals for humans.
[b]Mochida concentrated fish oil (28% EPA:12% DHA).
[c]Fiber is expressed as g/8 fl oz. FOS (Fructooligosaccharide, Golden Technologies Inc.), gum arabic (Nutriloid arabic, TIC Gums), XOS (Xylooligosaccharide, Suntory, Inc.).
[d]Soy protein hydrolyzate PP750 (slightly hydrolyzed).

Total dietary intake and body weights of the control and liquid diet groups were recorded for each 24 hour period during the course of the 4 week experiment (1 week prior to the induction of colitis and 3 weeks following PG/PS or albumin injection).

To assess the effects of SAZ in this model, female Lewis rats were orally administered SAZ immediately following the induction of colitis. Rats were given chow ad libitum for the duration of the four week study period. Similar measurements were assessed as described below.

All rats receiving nutritional therapy or SAZ were euthanized with an overdose of pentobarbital and the distal colon and cecum were excised and opened longitudinally. The length and weight of the perfused segment were recorded and the tissue divided longitudinally into three strips for wet-to-dry ratios, histology and myeloperoxidase (MPO) determinations. Colonic MPO activity was determined in which 3,3' 5,5' tetramethylbenzidine was used as the electron donating substrate and hexadecyltrimethylammonium hydroxide was used as the detergent. Spleen and liver weights were recorded. Circulating levels of nitrate and nitrite were also quantified using the Griess reagent and used as indices of immune system activation (i.e. activation of the reticuloendothelial system (nitric oxide synthase)). The studies were analyzed as a completely randomized design. Treatment differences were separated using an F-protected least significant difference (LSD) method. In both studies additional chow fed control animals that were treated under laboratory conditions described above were incorporated in the statistical analysis.

Effects of SAZ administration are presented in Table 7. It was found that oral administration of SAZ beginning immediately following induction of colitis significantly attenuated the increases in MPO activity and tended to reduce colon weight compared to a chow fed group receiving PG/PS suggesting that this antiinflammatory agent inhibits granulocyte infiltration and fibrosis (we observed no significant increase in wet to dry ratios in our inflamed bowel suggesting that the increases in colon weight were due to collagen deposition). Histological inspection of the SAZ-treated tissue confirmed inhibition of leukocyte infiltration and fibrosis. Previous studies have demonstrated that the inflammation induced by the intramural (subserosal) injection of PG/PS is primarily submucosal in nature and heterogeneous with respect to epithelial cell injury. For example histological inspection of this tissue reveals foci of modest epithelial injury surrounded by regions of a completely intact epithelium.

In addition to its protective effects on the colon, SAZ treatment resulted in liver and spleen weights significantly lower than the PG/PS treated animals and comparable to the sham control suggesting that SAZ inhibits granuloma development and necrosis in these two organs. At present, the mechanism by which SAZ protects these two organs remains undefined. It may be that SAZ protects primarily the gut thereby inhibiting the emigration of noxious luminal antigens and bacterial products into the portal and systemic circulation where they may promote distal organic inflammation. Alternatively, SAZ or one of its active metabolites (e.g. 5-ASA) is present in the systemic circulation and may exert direct antiinflammatory action on the various organ systems. The antiinflammatory mechanism of SAZ remains the subject of active debate. There is a large body of experimental data to suggest that the active moiety of SAZ is 5-ASA which is a potent antioxidant and is a modest 5-lipoxygenase inhibitor. In addition, there is emerging evidence to suggest that the parent diazo compound (ie., SAZ) may possess significant antiinflammatory activity.

Figure 2:
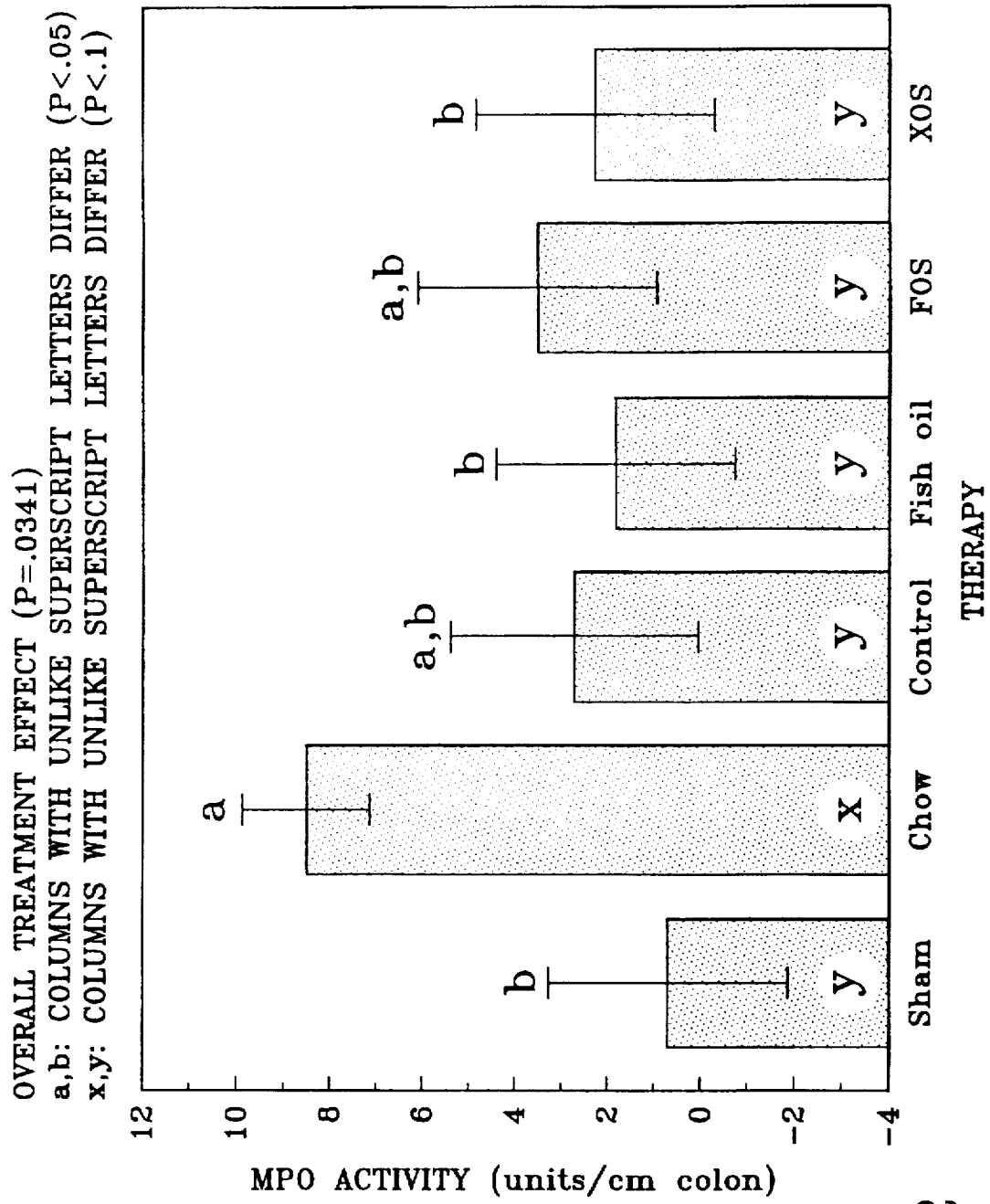
FIG. 2 Comparison of enteral diets and their effects on the attenuation of myeloperoxidase (MPO) activity.
Figure 3:
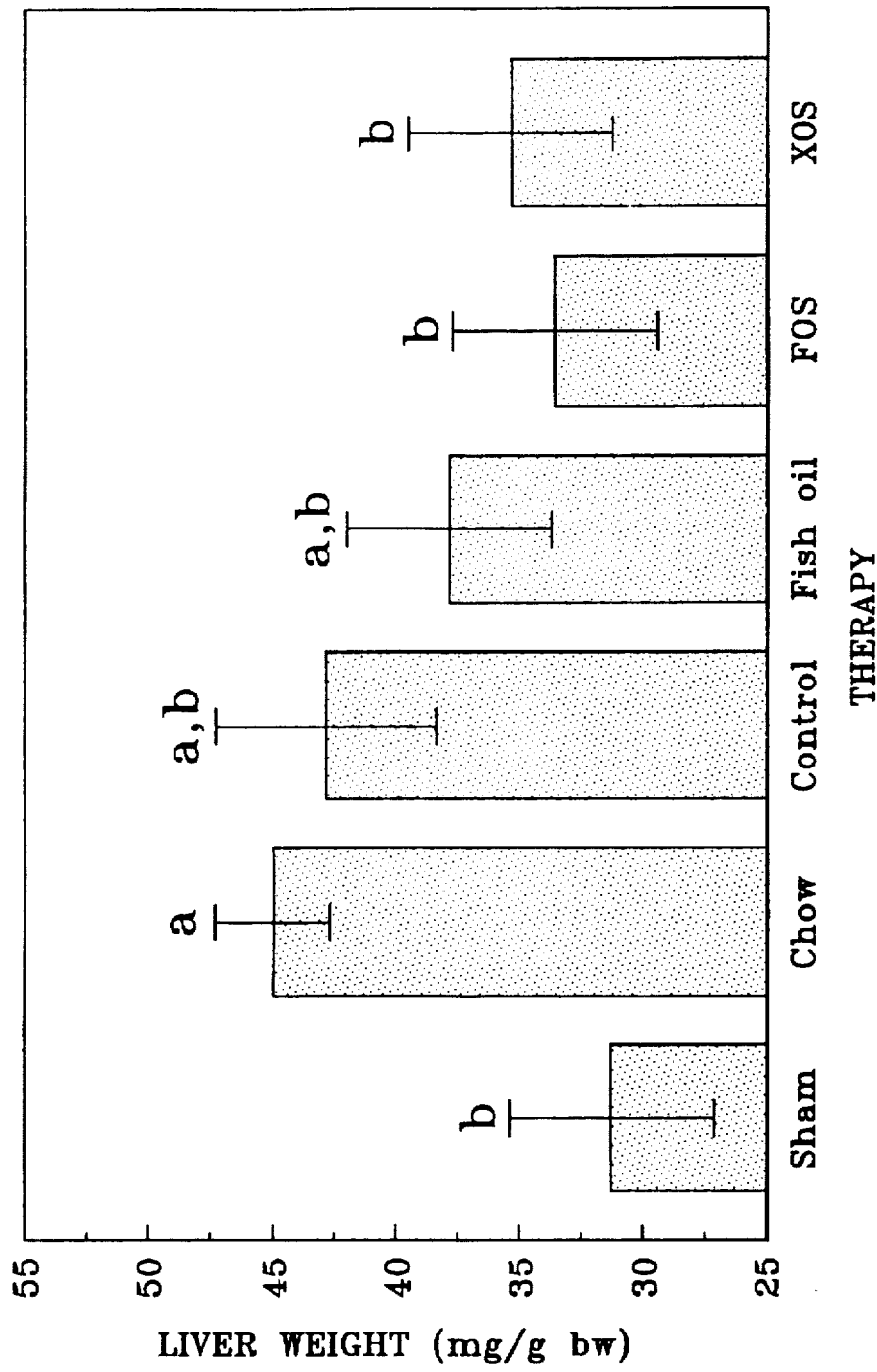
FIG. 3 Comparison of enteral diets and their effects on rat liver weights.
Figure 4:
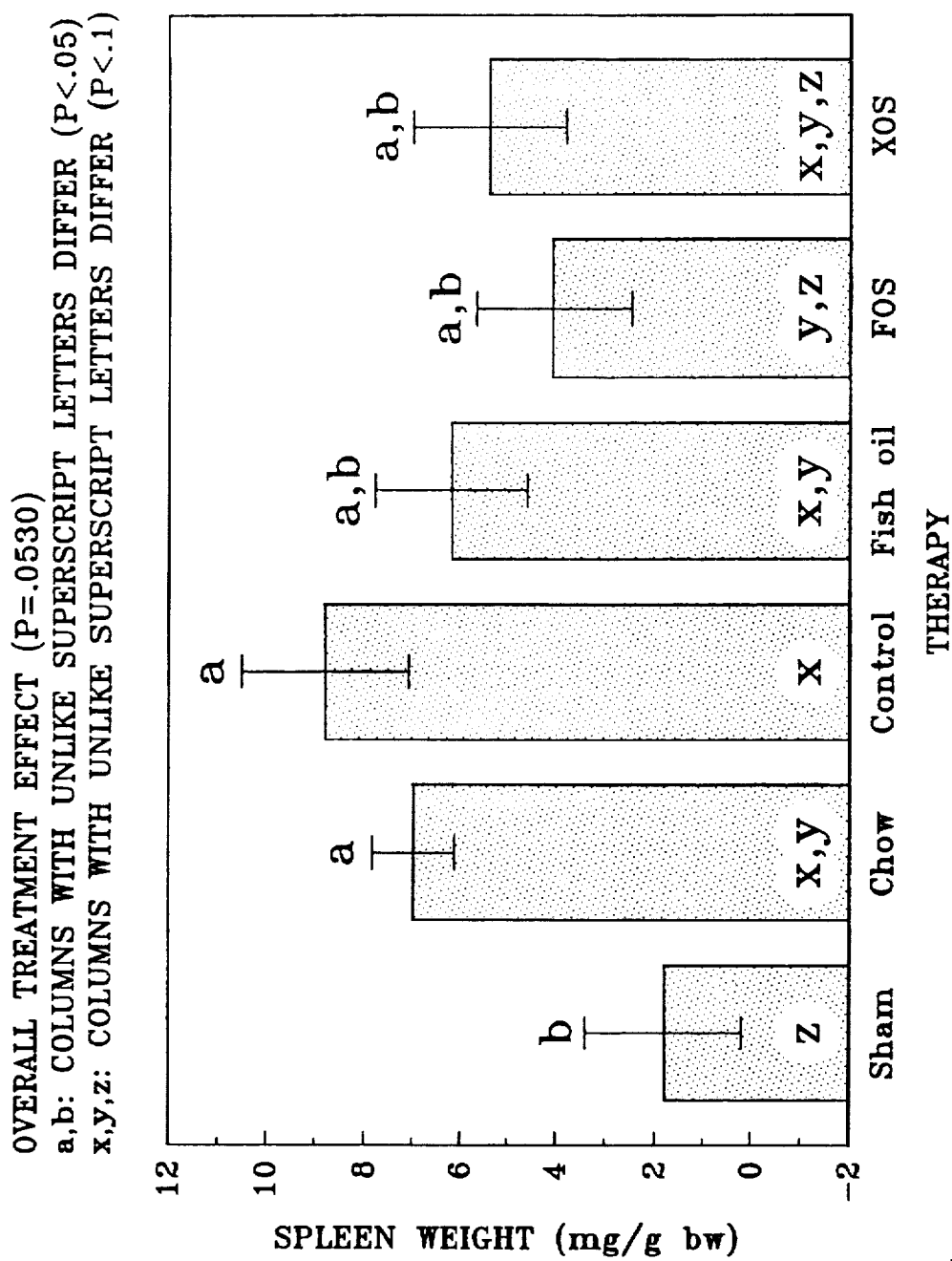
FIG. 4 Comparison of enteral diets and their effects on rat spleen weights.
Figure 5:
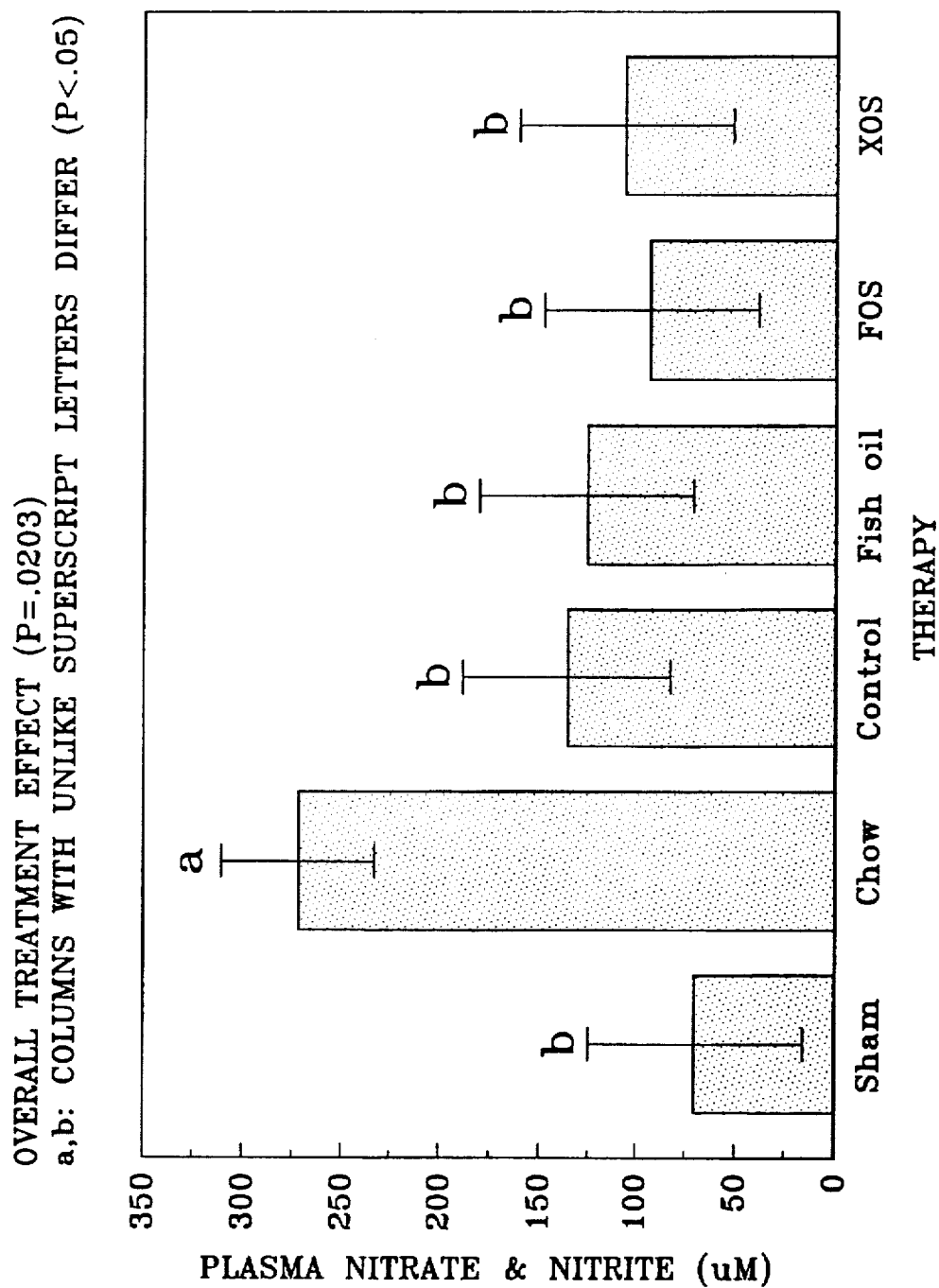
FIG. 5 Comparison of enteral diets and their effects on plasma nitrate and plasma nitrite concentrations.

Recent studies have suggested that nutritional supplementation in the form of enteral diets may prove useful as adjunctive or primary therapy for patients with IBD. Indeed, recent reports suggest that n-3 fatty acids from fish oil as well as the SCFA produced during the fermentation of indigestible carbohydrates may attenuate some of the pathophysiology associated with active gut inflammation. Therefore, we ascertained whether three enteral diets, one supplemented with fish oil or two different diets supplemented with two forms of indigestible carbohydrate could inhibit some of the inflammation observed in a model of chronic colitis. The results are presented in FIGS. 1–5. FIG. 1 presents colon weights of animals following the various therapies (diets). FIG. 2 presents MPO activity in colonic tissue of rats following the various therapies (diets). FIG. 3 presents liver weights of animals following the various therapies (diets). FIG. 4 presents spleen weights in the animals following the various therapies (diets). FIG. 5 presents levels in circulating plasma of nitrate and nitrite in animals following the various therapies (diets).

TABLE 7

EFFECTS OF SAZ

| TREAT-MENT | COLON WT (g dry wt/cm) | MPO ACTIVITY (unit/cm colon) | Liver wt (mg/g bw) | Spleen wt (mg/g bw) |
|---|---|---|---|---|
| Sham Chow | .016 ± .003[b] | 1.17 ± 2.5[b] | 31.5 ± 3.1[b] | 2.08 ± 1.1[b] |
| PG/PS Chow | .029 ± .002[a] | 8.49 ± 1.6[a] | 45.0 ± 2.0[a] | 6.95 ± .70[a] |
| SAZ | .021 ± .004[a,b] | 1.40 ± 2.9[b] | 34.0 ± 3.6[b] | 2.92 ± 1.3[b] |
| [c]P = | .0045 | .0195 | .0008 | .0007 |

[a,b]Least Square means with unlike superscript letters differ (P < .05).
[c]= Overall treatment effect.

Results indicate that all enteral diets used in this study provided for a certain degree of antiinflammatory activity. The addition of fish oil or indigestible oligosaccharides such as FOS and XOS demonstrated greater antiinflammatory activity compared to the base control or chow fed PG/PS rats. Antiinflammatory activity was ascertained using colon, liver and spleen weights along with MPO activity. Results show that the control diets as well as the fish oil and XOS diets produced colon weights that were significantly lower than chow fed PG/PS animals and comparable to the sham control (FIG. 1). While all enteral diets tended to attenuate MPO activity compared to chow PG/PS fed animals, only the fish oil and XOS diets were significantly lower than chow animals (FIG. 2). Only the chow fed PG/PS rats resulted in an MPO activity that was significantly greater than the sham control. Liver weights also were affected by the diet (FIG. 3). The FOS and XOS diets resulted in liver weights that were significantly lower than the chow fed PG/PS animals. Only chow fed PG/PS rats had liver weights that were significantly different than sham control animals. The fish oil, FOS and XOS diets resulted in spleen weights that were comparable to the sham control (FIG. 4). The control and chow diets produced spleen weights that were greater than the sham control. All enteral diets significantly attenuated the increase in nitrate and nitrite compared to chow fed animals. These levels were comparable to sham controls. This is of importance because it has been proposed that the large increases in circulating levels of nitrate and nitrite such as in the PG/PS chow fed group, arise from the production of nitric oxide by extravasated polymorphonuclear cells, monocytes and macrophages.

These results demonstrate that a complete enteral diet (control diet) given to rats for 28 days with distal colitis, reduced disease activity as indicated by the above indices of inflammation. However supplementation with the bioactive ingredients, fish oil, FOS or XOS, showed additional anti-inflammatory activity by significantly attenuating the colonic and extraintestinal inflammation associated with distal colitis. In most instances, these indices of inflammation were similar to those indices in chow fed sham controls. The antiinflammatory activity of these diets was confirmed via histological inspection showing an inhibition of inflammation and maintenance of crypt cell integrity.

An interesting aspect of the present study is that supplementation of enteral diets with fish oil or indigestible oligosaccharides renders these diets similar in efficacy to a known antiinflammatory drug (SAZ) used to treat human IBD and which has been shown to be efficacious in this model of inflammation. Although enteral diets may be considered as alternative primary therapy for chronic gut inflammation, it may be more useful to consider their use as adjunctive therapy to be used in combination with steroids and/or aminosalicylates.

It is believed to be an important feature of an enteral nutritional product of the present invention that it contains an oil blend which comprises, by weight, a total of at least 25% of one or more oils selected from the group of oils which contain eicosapentaenoic acid (20:5n3) and docosahexaenoic acid (22:6n3). The nutritional product of the invention may comprise the oil blend presented in Table 8. Other features of an oil blend useful in the practice of the present invention are presented in Table 9 and 10.

TABLE 8

ULCERATIVE COLITIS PRODUCT OIL BLEND
(as % of total weight of oil blend)

| OIL | TARGET | PREFERRED RANGE |
|---|---|---|
| Canola Oil | 9.3% | 5.0%–40.0% |
| MCT | 16.2% | 10.0%–50.0% |
| Fish Oil | 65.0% | 25.0%–80.0% |
| Soybean Oil | 5.5% | 3.0%–30.0% |
| Soy Lecithin | 4.0% | 2.0%–6.0% |

TABLE 9

FATTY ACID PROFILE OF NEW LIPID BLEND
(as % of total fatty acids by weight, by analysis)

| Caproic (6:0) | 0.53 |
|---|---|
| Capyrlic (8:0) | 10.35 |
| Capric (10:0) | 7.16 |
| Lauric (12:0) | 0.29 |
| Myristic (14:0) | 3.53 |
| Palmitic (16:0) | 7.41 |
| Palmitoleic (16:1n7) | 5.73 |
| Stearic (18:0) | 1.39 |
| Oleic (8:1n9) | 15.23 |
| Linoleic (18:2n6) | 7.21 |
| Gamma-Linolenic (18:3n6) | 0.21 |
| Alpha-linolenic (18:3n3) | 2.21 |
| Stearidonic (18:4n3) | 2.40 |
| Arachidic (20:0) | 0.13 |
| Eicosenoic (20:1n9) | 0.74 |
| Arachidonic (20:4n6) | 0.87 |
| Eicosapentaenoic (20:5n3) | 17.14 |
| Erucic (22:1n9) | 0.17 |
| Docosapentaenoic (22:5n3) | 2.08 |
| Docosahexaenoic (22:6n3) | 7.73 |
| Nervonic (24:1n9) | 0.14 |
| Others | 7.35 |
| TOTAL | 100.00 |

TABLE 10

FATTY ACID LEVELS IN OIL BLEND
(percent of total fatty acids)

| FATTY ACID | TARGET | PREFERRED RANGE | MOST PREFERRED RANGE |
|---|---|---|---|
| Oleic acid (18:1n9) | 13.5% | 11.5%–15.7% | 12.1%–15.1% |
| Linoleic acid (18:2n6) | 7.8% | 6.6%–9.0% | 7.0%–8.6% |
| Alpha-Linolenic acid (18:3n3) | 1.8% | 1.5%–2.1% | 1.6%–2.0% |
| Eicosapentaenoic | 17.8% | 15.1%–20.5% | 16.0%–19.6% |

TABLE 10-continued

FATTY ACID LEVELS IN OIL BLEND
(percent of total fatty acids)

| FATTY ACID | TARGET | PREFERRED RANGE | MOST PREFERRED RANGE |
|---|---|---|---|
| acid (20:5n3) | | | |
| Docosahexaenoic acid (22:6n3) | 7.5% | 6.3%–8.6% | 6.7%–8.3% |
| n-6/n-3 ratio | 0.32 | 0.25–4.0 | |
| 18:2n6/18:3n3 | 4.26 | 3.0–10.0 | |

\* The n-6 fatty acids which are used in determining the n-6/n-3 ratio for the product disclosed herein are: Linoleic (18:2n6), Eicosadienoic (20:2n6) and Arachidonic (20:4n-6). The n-3 fatty acids which are used in determining the n-6/n-3 ratio for the product disclosed herein are: Alpha-linolenic (18:3n3), Stearidonic (18:4n3), Eicosapentaenoic (20:5n3) Docosapentaenoic (22:5n3) and Docosahexaenoic (22:6n3).

While not intending to be bound by theory, the combination of indigestible carbohydrate and specifically dietary fiber and indigestible oligosaccharides with fish oil may increase the incorporation of n-3 fatty acids into colonocytes. The incorporation of n-3 fatty acids into colonocytes of persons consuming polymeric/elemental diets devoid of indigestible fermentable material is slow. Hypoproliferation of colonocytes and atrophy is documented with elemental low residue diet feedings. Fermentable indigestible oligosaccharide such as fructooligosaccharides can promote cell proliferation. Rate and extent of n-3 fatty acid incorporation into colonocytes is dependent on exchange of plasma n-3 fatty acids and colon mucosal phospholipids and rate of colonic cell turnover. The maintenance or promotion of cell proliferation due to the incorporation of indigestible carbohydrate into a liquid diet containing n-3 fatty acids could promote a rapid increase of n-3 fatty acids from fish oil into colonic mucosal lipids compared to a liquid diet devoid of indigestible carbohydrate. The therapeutic benefit of increasing the incorporation of n-3 fatty acids into colonic mucosal phospholipids is to (a) promote an antiinflammatory effect by modulating local eicosanoid generation by the gastrointestinal mucosa of ulcerative colitis patients and (b) promote the rapid incorporation of n-3 fatty acids from fish oil in the gastrointestinal mucosa of ulcerative colitis patients which will decrease the hyperimmune response resulting in reduced mucosal ulceration and disease activity index.

A growing body of data indicates that oxygen derived free radicals such as superoxide ($O_2$\*), hydrogen peroxide ($H_2O_2$), and hydroxyl radicals (OH \*) have a role in mediating intestinal damage in inflammatory bowel disease. The most probable source of these oxidants are the phagocytic leukocytes since these cells are known to be present in large numbers in the inflamed mucosa and have been shown to produce significant amounts of reactive oxygen species in response to certain inflammatory stimuli. Grisham, "Role of Neutrophil—Derived Oxidants in the Pathogenesis of Inflammatory Bowel Disease", PROGRESS IN INFLAMMATORY BOWEL DISEASE, Vol. 12, No. 1, pages 6–8 (1991). Grisham et al., "Neutrophil-Mediated Mucosal Injury, Role of Reactive Metabolites", DIGESTIVE DISEASES AND SCIENCES, Vol. 33, No. 3, pages 6–15S (1988), have hypothesized that in ulcerative colitis, transient ischemia-reperfusion episodes produce high levels of free radicals resulting in mucosal ulceration.

Grisham et al., "Oxidant Mechanisms in the Human Colon", INFLAMMATION, Vol. 14, No. 6, pages 669–680 (1990) have determined that the normal colon, particularly the mucosa, contains small amounts of antioxidant enzyme systems such as superoxide dismutase, catalase, and GSH peroxide suggesting that the colon may be susceptible to oxidant-mediated damage. Data, however, on endogenous antioxidant proteins in the intestinal mucosa of patients with inflammatory bowel disease are lacking. The two most important copper and zinc containing proteins with radical scavenging potential are metallothionein and superoxide dismutase. Metallothionein is a metal binding protein whose function is the regulation of copper and zinc metabolism. Thornalley et al., "Possible Role for Metallothionein in Protection Against Radiation—Induced Oxidative Stress. Kinetics and Mechanism of its Reaction with Superoxide and Hydroxyl Radicals", BIOCHEMICAL ET BIOPHYSICAL ACTA, Vol. 827, pages 36–44 (1985), were the first to note the high OH scavenging potentials of metallothionein. Since then it has been found to protect DNA molecules, cells in culture, and whole organisms against the detrimental effects of several types of free radical generating treatments. Abel et al., "Inhibition of Hydroxyl-Radical-Generated DNA Degradation by Metallothionein", TOXICOLOGY LETTERS, Vol. 47, pages 191–196 (1989); Bakka et al., "Radioresistance in Cells with High Content of Metallothionein", EXPERENTIA SUPPLEMENTUM, Vol. 38, pages 381–383 (1982); Matsubara, "Alteration of Radiosensitivity in Metallothionein Induced Mice and a Possible Role of Zn—Cu-Thioneine in GSH—Peroxidase System", EXPERENTIA, Vol. 52, pages 603–613 (1987). Furthermore, Mulder et al., "Decrease in Two Intestinal Copper/Zinc Containing Proteins with Antioxidant Function in Inflammatory Bowel Disease", GUT, Vol. 32, pages 1146–1150 (1991), found that superoxide dismutase content was similar in control mucosa and non-inflamed mucosa from patients with inflammatory bowel disease but was decreased in inflamed mucosa. Similar results were also shown with metallothionein. Overall, a decrease in endogenous intestinal protection against oxygen derived radicals in inflammatory bowel disease may contribute to the pathogenesis of the disease.

Considering the compromised antioxidation state of the large bowel of inflammatory bowel disease patients, it would be beneficial to increase intakes of vitamins which have antioxidant properties. Vitamins E, C and beta-carotene are among the most important of these antioxidant vitamins, but the minerals manganese, copper, zinc and selenium are also required for the functional status of the antioxidant enzymes, metallothionein and superoxide dismutase. In a preferred embodiment the enteral nutritional product of the present invention contains at least one nutrient selected from the group consisting of beta-carotene, vitamin E, vitamin C, taurine and selenium. An enteral nutritional product according to the present invention has about 18.5%-23.5% (most preferably about 21.0%) of total calories provided by protein, about 59.0%-63.0% (most preferably about 61.0%) of total calories provided by carbohydrate, and about 16.0%-20.0% (most preferably about 18.0%) of total calories provided by fat. Preferably the protein source contains at least one material selected from the group consisting of intact and hydrolyzed (regardless of degree of hydrolysis) proteins of high biological value. "High biological value" is understood to mean a protein source which provides a full complement of amino acids to the body. An enteral nutritional product according to the present invention preferably contains about 20g of indigestible carbohydrate per liter. The source of indigestible carbohydrate may be selected from gum arabic, soy polysaccharide, fructooligosaccharides, hydrolyzed inulin, xylooligosaccharides or any other suitable material.

Key features of the nutritional product are presented in Table 11. the amino acid profile of the product is presented in Table 12 and a more complete nutrient profile of the enteral nutritional product of the present invention is presented in Table 13.

TABLE 11

KEY NUTRIENT FEATURES OF PRODUCT
(percentages are % of total calories in product from nutrient)

| NUTRIENT | TARGET | PREFERRED RANGE |
|---|---|---|
| Protein | 21.0% (67.8 g/L) | 18.5%–23.5% (59.7 g/L–75.9 g/L) |
| Carbohydrate | 61.0% (201.5 g/L) | 59.0%–63.0% (194.9 g/L–208.1 g/L) |
| Fat | 18.0% (28.2 g/L) | 16.0%–18.0% (25.1 g/L–31.3 g/L) |
| Beta-carotene | 5,000 ug/L | 2,500 ug/L–6,500 ug/L |
| Vitamin E | 300 IU/L | 100 IU/L–450 IU/L |
| Vitamin C | 650 mg/L | 250 mg/L–850 mg/L |
| Taurine | 275 mg/L | 200 mg/L–350 mg/L |
| Indigestible Carbohydrate | 19.89 g/L | 16.91 g/L–22.87 g/L |

TABLE 12

AMINO ACID PROFILE OF PRODUCT
(Per actual analysis, values normalized to 100%)

| AMINO ACID | g/100 g Protein |
|---|---|
| Aspartic Acid | 7.08 |
| Threonine | 4.34 |
| Serine | 5.68 |
| Glutamic Acid | 20.58 |
| Proline | 10.55 |
| Glycine | 1.81 |
| Alanine | 3.04 |
| Valine | 5.90 |
| Methionine | 2.78 |
| Isoleucine | 4.77 |
| Leucine | 9.08 |
| Tyrosine | 4.79 |
| Phenylalanine | 4.96 |
| Histidine | 2.67 |
| Lysine | 7.27 |
| Arginine | 3.15 |
| Tryptophan | 0.99 |
| Cystine | 0.56 |

TABLE 13

PREFERRED NUTRIENT PROFILE OF THE ULCERATIVE COLITIS NUTRITIONAL PRODUCT

| RANGE/QUANTITY NUTRIENT | TARGET QUANTITY/ LITER | ACCEPTABLE QUANTITY/ LITER |
|---|---|---|
| Protein, g | 67.4 | 66–70 |
| Fat, g | 27.2 | 25–29 |
| Carbohydrate, g | 207 | 204–215 |
| Total Dietary Fiber, g | 10.7 | 9.1–12.3 |
| Indigestible Oligosaccharide (FOS), g | 12.4 | 10.5–14.3 |
| Gum Arabic, g | 9.1 | 7.7–10.5 |
| Soy Polysaccharide, g | 1.6 | 1.4–1.8 |
| β-carotene, μg | 5000 | 2500–6500 |
| Vitamin A, IU | 5500 | 4500–6500 |
| Vitamin D, IU | 800 | 675–950 |
| * Vitamin E, IU | 300 | 100–450 |

TABLE 13-continued

PREFERRED NUTRIENT PROFILE OF THE ULCERATIVE COLITIS NUTRITIONAL PRODUCT

| RANGE/QUANTITY NUTRIENT | TARGET QUANTITY/ LITER | ACCEPTABLE QUANTITY/ LITER |
|---|---|---|
| Vitamin $K_1$, μg | 135 | 120–150 |
| Vitamin C, mg | 650 | 250–850 |
| Folic Acid, μg | 1900 | 1688–2150 |
| Thiamine, mg | 6.5 | 2.53–8.0 |
| Riboflavin, mg | 5 | 2.87–6.5 |
| Vitamin $B_6$, mg | 5 | 3.38–6.5 |
| Vitamin $B_{12}$, μg | 18 | 10.1–25.0 |
| Niacin, mg | 40 | 33.8–50.0 |
| Choline, mg | 525 | 506–900 |
| Biotin, μg | 750 | 506–1000 |
| Pantothenic Acid, mg | 24 | 16.9–30 |
| Sodium, mg | 1500 | 1350–1650 |
| Potassium, mg | 2000 | 1800–2200 |
| Chloride, mg | 1519 | 1367–1671 |
| Calcium, mg | 1800 | 1477–1920 |
| Phosphorous, mg | 1250 | 1055–1372 |
| Magnesium, mg | 450 | 422–550 |
| Iodine, μg | 175 | 158–300 |
| Copper, mg | 2.61 | 2.25–3.0 |
| Zinc, mg | 29.2 | 25.3–35.0 |
| Iron, mg | 22.2 | 20.3–25.0 |
| Selenium, μg | 90 | 78.8–125 |
| Chromium, g | 125 | 112.5–150 |
| Molybdenum, μg | 206 | 168.8–250 |
| Carnitine, mg | 150 | 127–200 |
| Taurine, mg | 275 | 200–350 |
| Kcal/mL | 1.29 | 1.27–1.34 |

* d-alpha-tocopheryl (all natural form) or dl-alpha tocopherol acetate, or a combination of the two The Bill of Materials for manufacturing an enteral nutritional product in accordance with the present invention is presented in Table 14. It is understood that various changes in ingredients and quantities may be made without departing from the scope of the invention.

TABLE 14

BILL OF MATERIALS
BATCH SIZE = 45,360 Kgs (100,000 LBS)

| INGREDIENT | AMOUNT |
|---|---|
| WATER | 31,605.21 Kgs |
| GUM ARABIC | 437.84 Kgs |
| ULTRATRACE/TRACE MINERAL PREMIX | 14.50 Kgs |
| ZINC SULFATE | 2969.89 gms |
| FERROUS SULFATE | 2856.50 gms |
| MANGANESE SULFATE | 784.60 gms |
| CUPRIC SULFATE | 423.11 gms |
| SODIUM MOLYBDATE | 21.39 gms |
| CHROMIUM CHLORIDE | 20.80 gms |
| SODIUM SELENITE | 8.11 gms |
| CITRIC ACID | 894.94 gms |
| SUCROSE (Carrier) | 6520.67 gms |
| POTASSIUM CITRATE | 50.00 Kgs |
| SODIUM CITRATE | 95.00 Kgs |
| POTASSIUM IODIDE | 9.00 gms |
| POTASSIUM CHLORIDE | 91.00 Kgs |
| CORN SYRUP SOLIDS | 5630.96 Kgs |
| MALTODEXTRIN | 1407.52 Kgs |
| MAGNESIUM PHOSPHATE DIBASIC | 131.00 Kgs |
| CALCIUM PHOSPHATE TRIBASIC (PREFERABLY MICRONIZED) | 47.50 Kgs |
| CALCIUM CARBONATE | 122.50 Kgs |
| SUGAR (SUCROSE) | 852.77 Kgs |
| FRUCTOOLIGOSACCHARIDE | 509.96 Kgs |
| MEDIUM CHAIN TRIGLYCERIDES | 172.69 Kgs |

TABLE 14-continued

BILL OF MATERIALS
BATCH SIZE = 45,360 Kgs (100,000 LBS)

| INGREDIENT | AMOUNT |
| --- | --- |
| (FRACTIONATED COCONUT OIL) | |
| CANOLA OIL | 99.13 Kgs |
| SOY OIL | 58.63 Kgs |
| 57% VITAMIN A PALMITATE | 250.00 gms |
| 2.5% VITAMIN D | 35.00 gms |
| D-ALPHA-TOCOPHERYL ACETATE (R.R.R) | 10.65 Kgs |
| PHYLLOQUINONE | 6.50 gms |
| 30% BETA-CAROTENE | 824.00 gms |
| SOY LECITHIN | 42.64 Kgs |
| SODIUM CASEINATE | 1427.04 Kgs |
| PARTIALLY HYDROLYZED SODIUM CASEINATE | 1427.04 Kgs |
| SOY POLYSACCHARIDE | 85.28 Kgs |
| 75% WHEY PROTEIN CONCENTRATE | 184.46 Kgs |
| REFINED DEODORIZED SARDINE OIL | 692.87 Kgs |
| ASCORBIC ACID | 37.08 Kgs |
| 45% POTASSIUM HYDROXIDE | 25.96 Kgs |
| TAURINE | 12.00 Kgs |
| WATER SOLUBLE VITAMIN PREMIX | 4.50 Kgs |
| NIACINAMIDE | 1688.60 gms |
| CALCIUM PANTOTHENATE | 1092.24 gms |
| THIAMINE CHLORIDE HYDROCHLORIDE | 278.78 gms |
| PYRIDOXINE HYDROCHLORIDE | 268.34 gms |
| RIBOFLAVIN | 217.87 gms |
| FOLIC ACID | 37.82 gms |
| BIOTIN | 32.87 gms |
| CYANOCOBALAMIN | 0.75 gms |
| DEXTROSE (Carrier) | 882.74 gms |
| FOLIC ACID | 43.50 gms |
| CHOLINE CHLORIDE | 25.00 Kgs |
| L-CARNITINE | 7.00 Kgs |
| ARTIFICIAL STRAWBERRY FLAVOR | 31.75 Kgs |
| ARTIFICIAL CREAM FLAVOR | 18.14 Kgs |
| FD & C Red Dye No. 3 | 1,220.16 gms |

The liquid nutritional product of the present invention has been manufactured by preparing three slurries which are blended together, combined with refined deodorized sardine oil, heat treated, standardized, packaged and sterilized. The process for manufacturing 45,360 Kgs (100,000 pounds) of the liquid nutritional product, using the Bill of Materials from Table 11, is described in detail below.

A carbohydrate/mineral slurry is prepared by first heating about 6,260 Kgs of water to a temperature in the range of about 71° to 77° C. with agitation. The gum arabic is then added to the water using a mixing apparatus. Next the ultratrace/trace mineral premix is added to the water and dissolved by agitating the resultant solution for at least one minute. The following minerals are then added, in the order listed, with high agitation: Potassium Citrate, Sodium Citrate, Potassium Iodide and Potassium Chloride. The corn syrup solids and maltodextrin are then added to the slurry and the temperature of the slurry is maintained at about 71° C. with high agitation for at least about 20 minutes. The product has been manufactured using maltodextrin distributed by Grain Processing Corporation, Muscatine, Iowa, U.S.A. under the trade designation "Maltrin M-100" and corn syrup solids distributed by Grain Processing Corporation under the trade designation "Maltrin M-200". Add the Magnesium Phosphate Dibasic, Calcium Phosphate Tribasic, and Calcium Carbonate to the slurry. The sugar (sucrose), and Fructooligosaccharide are added to the slurry. The product has been manufactured using fructooligosaccharide powder distributed by Golden Technologies Company, Golden, Colo., U.S.A. under the trade designation "Nutriflora-P Fructo-oligosaccharide Powder (96%)". The completed carbohydrate/mineral slurry is held with high agitation at a temperature in the range of about 60° to 66° C. for not longer than 12 hours until it is blended with the other slurries.

An oil slurry is prepared by combining and heating the medium chain triglycerides (fractionated coconut oil), canola oil and soy oil to a temperature in the range of about 32° to 43° C. with agitation. The 57% Vitamin A Palmitate, 2.5% Vitamin $D_3$, D-alpha-tocopheryl acetate (R.R.R form), phylloquinone and 30% beta-carotene are added to the slurry with agitation. The product has been manufactured using D-alpha tocopheryl Acetate distributed by Distillation Products Industries, a division of Eastman Kodak Chemical Company, Rochester, N.Y. U.S.A. under the trade designation "Eastman Vitamin E 6–81 D-Alpha Tocopheryl Acetate Concentrate". The soy lecithin is then added to the slurry with agitation. The completed oil slurry is held under moderate agitation at a temperature in the range of about 32° to 43° C. for not longer than 12 hours until it is blended with the other slurries.

A protein-and-fiber-in-water slurry is prepared by first heating about 19,678 Kgs of water to a temperature in the range of about 60° to 63° C. with agitation. The sodium caseinate, partially hydrolyzed sodium caseinate and soy polysaccharide are blended into the slurry using a mixing apparatus. The product has been manufactured using a partially hydrolyzed sodium caseinate distributed by New Zealand Milk Products, Santa Rosa, Calif., U.S.A. under the trade name Alanate 167. The temperature of the slurry is lowered to about 57° to 60° C. and then the 75% whey protein concentrate is added to the slurry using a mixing apparatus. The completed protein-and-fiber-in-water slurry is held under agitation at a temperature in the range of about 54° to 60° C. for not longer than 2 hours before being blended with the other slurries.

The oil slurry and the protein-and-fiber-in-water slurry are blended together with agitation and the resultant blended slurry is maintained at a temperature in the range of about 54° to 66° C. After waiting for at least one minute the carbohydrate/mineral slurry is added to the blended slurry from the preceding step with agitation and the resultant blended slurry is maintained at a temperature in the range of about 54° to 66° C. The vessel which contained the carbohydrate/mineral slurry should be rinsed with about 220 Kgs of water and the rinse water should be added to the blended slurry. The refined deodorized sardine oil is then added to the slurry with agitation. (It is believed that in a most preferred method of manufacture the sardine oil would be slowly metered into the product as the blend passes through a conduit at a constant rate.) The product has been manufactured using deodorized sardine oil distributed by Mochida International Company, Limited, Shinjuku-ku, Tokyo, Japan under the trade designation "50% Omega-3 marine oil EPA:DHA 28:12 with 0.8% mixed tocopherol as antioxidant". Preferably after at least 5 minutes the pH of the blended slurry is determined. If the pH of the blended slurry is below 6.55, it is adjusted with dilute potassium hydroxide to a pH of 6.55 to 6.8.

After waiting a period of not less than one minute nor greater than two hours the blended slurry is subjected to deaeration, Ultra-High-Temperature (UHT) treatment, and homogenization, as described below:

A. Use a positive pump for supplying the blended slurry for this procedure.

B. Heat the blended slurry to a temperature in the range of about 66–71° C.

C. Deaerate the blended slurry to 25.4–38.1 cm of Hg.

D. Emulsify the blended slurry at 61–75 Atmospheres.

E. Heat the blended slurry to a temperature in the range of about 120° to 122° C. by passing it through a plate/coil heat exchanger with a hold time of approximately 10 seconds.

F. UHT heat the blended slurry to a temperature in the range of about 144° to 147° C. with a hold time of approximately 5 seconds.

G. Reduce the temperature of the blended slurry to be in the range of about 120–122° C. by passing it through a flash cooler.

H. Reduce the temperature of the blended slurry to be in the range of about 71° to 820° C. by passing it through a plate/coil heat exchanger.

I. Homogenize the blended slurry at about 265 to 266 Atmospheres.

J. Pass the blended slurry through a hold tube for at least 16 seconds at a temperature in the range of about 74° to 85° C.

K. Cool the blended slurry to a temperature in the range of about 1 to 7° C. by passing it through a large heat exchanger.

Store the blended slurry at a temperature in the range of about 1 to 7° C., preferably with agitation.

Preferably at this time appropriate analytical testing for quality control is conducted. Based on the test results an appropriate amount of dilution water (10–38° C.) is added to the blended slurry with agitation.

A vitamin solution, a flavor and a color solution are prepared separately and then added to the blended slurry.

The vitamin solution is prepared by heating about 394 Kgs of water to a temperature in the range of about 43° to 66° C. with agitation, and thereafter adding the following ingredients, in the order listed: Ascorbic Acid, 45% Potassium Hydroxide, Taurine, Water Soluble Vitamin Premix, Folic Acid, Choline Chloride, and L-Carnitine. The vitamin solution is then added to the blended slurry with agitation.

The flavor solution is prepared by adding the artificial strawberry flavor and artificial cream flavor to about 794 Kgs of water with agitation. A nutritional product according to the present invention has been manufactured using an artificial strawberry flavor distributed by Firmenich Inc., Princeton, N.J., U.S.A. under the trade designation "Art. strawberry 57.883/A" and an artificial cream flavor distributed by Firmenich Inc. under the trade designation "Art Cream 59.200/A". The flavor solution is then added to the blended slurry with agitation.

A color solution is prepared by adding the FD&C Red Dye No. 3 to about 121 Kg of water with agitation. The color solution is then added to the blended slurry with agitation.

If necessary, diluted potassium hydroxide is added to the blended slurry such that the product will have a pH in the range of 6.4 to 7.0 after sterilization. The completed product is then placed in suitable containers and subjected to sterilization. Of course, if desired aseptic processing could be employed.

A method of improving the nutritional status and reversing the characteristic diarrhea and inflammatory condition in a mammalian creature, such as a human, having ulcerative colitis or inflammation of the colon comprises enterally feeding to such a mammalian creature, or human, a therapeutically effective amount of the nutritional product disclosed herein. Clinical trials evaluating the enteral nutritional product disclosed herein in humans will begin in the near future and data supporting the beneficial properties of the instant invention will be provided. It is expected that this data will confirm the positive effect of the product disclosed herein upon ulcerative colitis.

While certain representative embodiments have been described herein for the purpose of illustrating the invention, it is understood that persons of skill in the art can make various modifications to these illustrative embodiments without deviating from the scope of the invention.

We claim:

1. A nutritional product for enteral feeding comprising in combination:

(a) a source of indigestible carbohydrate which is metabolized to short chain fatty acids by microorganisms present in the human colon and which comprises at least one material selected from the group consisting of indigestible oligosaccharides; and (b) an oil blend characterized by a fatty acid profile, expressed as percentages by weight of total fatty acids in the oil blend, as follows:

| FATTY ACID | % OF TOTAL FATTY ACIDS |
| --- | --- |
| Oleic acid (18:1n9) | 11.5–15.7 |
| Linoleic acid (18:2n6) | 6.6–9.0 |
| Alpha-Linolenic acid (18:3n3) | 1.5–2.1 |
| Eicosapentaenoic acid (20:5n3) | 15.1–20.5 |
| Docosahexaenoic acid (22:6n3) | 6.3–8.6. |

2. A nutritional product according to claim 1 comprising an oil blend characterized by a fatty acid profile, expressed as percentages by weight of total fatty acids in the oil blend, as follows:

| FATTY ACID | % OF TOTAL FATTY ACIDS |
| --- | --- |
| Oleic acid (18:1n9) | 12.1–15.1 |
| Linoleic acid (18:2n6) | 7.0–8.6 |
| Alpha-Linolenic acid (18:3n3) | 1.6–2.0 |
| Eicosapentaenoic acid (20:5n3) | 16.0–19.6 |
| Docosahexaenoic acid (22:6n3) | 6.7–8.3. |

3. A nutritional product according to claim 1 comprising an oil blend characterized by a fatty acid profile, expressed as percentages by weight of total fatty acids in the oil blend, as follows:

| FATTY ACID | % OF TOTAL FATTY ACIDS |
| --- | --- |
| Oleic acid (18:1n9) | About 15.2 |
| Linoleic acid (18:2n6) | About 7.2 |
| Alpha-Linolenic acid (18:3n3) | About 2.2 |
| Eicosapentaenoic acid (20:5n3) | About 17.1 |
| Docosahexaenoic acid (22:6n3) | About 7.7. |

4. A nutritional product according to any of claims 1, 2 or 3 wherein, by weight, the ratio of the sum of all of the n-6 fatty acids in the oil blend to the sum of all of the n-3 fatty acids in the oil blend is in the range of 0.25 to 4.0.

5. A nutritional product according to any one of claims 1, 2 or 3 wherein, by weight, the ratio of Linoleic acid (18:2n6) in the oil blend to Alpha-Linolenic acid (18:3n-3) in the oil blend is in the range of 3.0–10.0.

6. A nutritional product according to claim 4 wherein, by weight, the ratio of Linoleic acid (18:2n6) in the oil blend to Alpha-Linolenic acid (18:3n-3) in the oil blend is in the range of 3.0–10.0.

7. A nutritional product according to claim 1 wherein the source of indigestible oligosaccharides comprises at least one material selected from the group consisting of fructooligosaccharides, hydrolyzed inulin and xylooligosaccharides.

8. A nutritional product according to claim 1 further comprising at least one nutrient selected from the group consisting of beta-carotene, vitamin E, vitamin C, taurine and selenium.

9. A nutritional product according to claim 8 further comprising at least one nutrient selected from the group consisting of beta-carotene, vitamin E, vitamin C, taurine and selenium.

10. A nutritional product for enteral feeding comprising in combination:
- (a) an oil blend which comprises: (1) by weight, a total of at least 25% of a mixture of oils wherein said oils are eicosapentaenoic acid (20:5n3) and docosahexaenoic acid (22:6:n3) and (2) the ratio, by weight, of eicosapentaenoic acid (20:5n3) to docosahexaenoic acid (22:6:n3) is in the range of 1.76 to 3.25;
- (b) an indigestible oligosaccharide which is metabolized to short chain fatty acids by microorganisms present in the human colon; and
- (c) at least one nutrient selected from the group consisting of beta-carotene, selenium, taurine, Vitamin C and vitamin E.

11. A nutritional product according to claim 10 wherein the group of oils which contain Eicosapentaenoic acid (20:5n3) and Docosahexaenoic acid (22:6n3) consists of fish oils, marine oils, algae oils, fungal oils and vegetable oil.

12. A nutritional product according to claim 10 wherein the source of indigestible carbohydrate contains at least one material selected from the group consisting of fructooligosaccharides, hydrolyzed inulin and xylooligosaccharides.

13. A nutritional product for enteral feeding comprising in combination:
- (a) an oil blend comprising by weight about 5–40% canola oil, about 10–50% medium chain triglycerides, about 25–80% fish oil, about 3–30% soybean oil, and about 2–6% soy lecithin, said oil end containing Eicosapentaenoic acid (20:5n3) and Docosahexaenoic acid (22:6n3), the ratio, by weight of Eicosapentaenoic acid (20:5n3) to Docosahexaenoic acid 22:6n3) being in the range of 1.76 to 3.25;
- (b) a source of indigestible carbohydrate which is metabolized to short chain fatty acids by microorganisms present in the human colon and which comprises at least one material selected from the group consisting of fructooligosaccharides and xylooligosaccharides;
- (c) at least one nutrient selected from the group consisting of beta-carotene, vitamin E, vitamin C, taurine and selenium; and
- (d) a source of protein.

14. A nutritional product according to claim 13 wherein the oil blend further comprises at least one oil selected from the group consisting of corn oil, safflower oil, high-oleic safflower oil, high-oleic sunflower oil, olive oil, borage oil, black currant seed oil and evening primrose oil.

15. A nutritional product according to claim 13 wherein, by weight, the ratio of the sum of all of the n-6 fatty acids in the oil blend to the sum of all of the n-3 fatty acids in the oil blend is in the range of 0.25 to 4.0.

16. A nutritional product according to any one of claims 13, 14 or 15 wherein, by weight, the ratio of Linoleic acid (18:2n6) in the oil blend to Alpha-Linolenic acid (18:3n-3) in the oil blend is in the range of 3.0 to 10.0.

17. An enteral nutritional product according to claim 13 having about 18.5%–23.5% of total calories provided by protein, about 59.0%–63.0% of total calories provided by carbohydrate, and about 16.0%–20.0% of total calories provided by fat.

18. An enteral nutritional product according to claim 13 wherein the source of protein comprises at least one material selected from the group consisting of intact and hydrolyzed proteins of high biological value.

* * * * *